United States Patent
Sakuma et al.

(10) Patent No.: US 10,122,232 B2
(45) Date of Patent: Nov. 6, 2018

(54) ROTARY ELECTRIC MACHINE

(71) Applicant: Aisin Seiki Kabushiki Kaisha, Kariya-shi (JP)

(72) Inventors: Masafumi Sakuma, Chiryu (JP); Teppei Tsuda, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 259 days.

(21) Appl. No.: 15/053,018

(22) Filed: Feb. 25, 2016

(65) Prior Publication Data
US 2016/0285336 A1 Sep. 29, 2016

(30) Foreign Application Priority Data

Mar. 27, 2015 (JP) ................................. 2015-067662

(51) Int. Cl.
| | |
|---|---|
| H02K 5/24 | (2006.01) |
| H02K 3/28 | (2006.01) |
| H02K 21/14 | (2006.01) |
| H02K 29/03 | (2006.01) |

(52) U.S. Cl.
CPC .............. H02K 3/28 (2013.01); H02K 21/14 (2013.01); H02K 29/03 (2013.01); H02K 2201/06 (2013.01); H02K 2201/15 (2013.01)

(58) Field of Classification Search
CPC .. H02K 5/24; H02K 3/28; H02K 3/12; H02K 29/03
USPC ............................................. 310/51, 156.47
See application file for complete search history.

(56) References Cited

U.S. PATENT DOCUMENTS

| | | | | |
|---|---|---|---|---|
| 2002/0167242 A1* | 11/2002 | Liu | .......................... | H02K 3/28 310/184 |
| 2008/0218022 A1* | 9/2008 | Lee | ........................ | H02K 1/276 310/156.53 |
| 2012/0019089 A1* | 1/2012 | Takemoto | .............. | H02K 1/276 310/156.54 |
| 2014/0084728 A1* | 3/2014 | Iwasaki | .................... | H02K 3/00 310/156.01 |

FOREIGN PATENT DOCUMENTS

| | | |
|---|---|---|
| JP | 2002-165428 | 6/2002 |
| JP | 2003-32983 | 1/2003 |
| JP | 2010-75049 | 4/2010 |

* cited by examiner

Primary Examiner — Hanh Nguyen
(74) Attorney, Agent, or Firm — Oblon, McClelland, Maier & Neustadt, L.L.P.

(57) ABSTRACT

A rotary electric machine includes a stator including a stator winding and a rotor movable relative to the stator in a first direction and arranged to face the stator in a second direction, the rotor including plural pairs of rotor poles at a rotor core, each pair of the plural pairs of rotor poles including different polarities from each other, the stator including a fractional slot configuration where the number of slots per pole per phase is a non-integer, the stator winding being wound by a fractional slot winding, one of a stator core and the rotor core including a base portion and either a single position portion or plural position portions which is connected to the base portion in a third direction and which is displaced relative to the base portion in the first direction, the third direction being orthogonal to the first direction and the second direction.

11 Claims, 15 Drawing Sheets

US 10,122,232 B2

ROTARY ELECTRIC MACHINE

CROSS REFERENCE TO RELATED APPLICATIONS

This application is based on and claims priority under 35 U.S.C. § 119 to Japanese Patent Application 2015-067662, filed on Mar. 27, 2015, the entire content of which is incorporated herein by reference.

TECHNICAL FIELD

This disclosure generally relates to a rotary electric machine in which a stator is formed in a fractional slot configuration and a stator winding is would by a fractional slot winding.

BACKGROUND DISCUSSION

According to a rotary electric machine in which a stator is formed in a fractional slot configuration, noise and vibration generated when the rotary electric machine is driven generally tends to increase as compared to a rotary electric machine in which a stator is formed in an integral slot configuration. JP2010-075049A which is hereinafter referred to as Reference 1, JP2003-032983A which is hereinafter referred to as Reference 2 and JP2002-165428A which is hereinafter referred to as Reference 3 are examples each of which includes an object to decrease noise and vibration generated at the time of driving of the rotary electric machine.

According to a rotary electric machine disclosed in Reference 1 where a stator includes the fractional slot configuration, the number of slots of the stator and the number of poles of a rotor are specified by a predetermined relational expression. Then, the rotary electric machine in Reference 1 obtains a combination of the number of stator poles and the number of rotor poles. In addition, the rotary electric machine in Reference 1 also attempts to reduce torque ripple of the rotary electric machine in the same way. The aforementioned conditions are also applied to rotary electric machines disclosed in References 2 and 3.

According to the rotary electric machines disclosed in References 1 to 3, the combination of the number of stator poles and the number of rotor poles is limited. As a result, in the rotary electric machine including a wide range of drive rotation numbers, it may be impossible to choose an appropriate combination of the number of stator poles and the number of rotor poles, which may inhibit noise, vibration and torque ripple, for example, generated at the driving of the rotary electric machine from decreasing.

A need thus exists for a rotary electric machine which is not susceptible to the drawback mentioned above.

SUMMARY

According to an aspect of this disclosure, a rotary electric machine includes a stator including a stator winding which is inserted to be positioned within plural slots formed at a stator core, and a rotor supported at the stator to be movable relative to the stator in a first direction and arranged to face the stator in a second direction, the rotor including plural pairs of rotor poles at a rotor core, each pair of the plural pairs of rotor poles including different polarities from each other, the stator including a fractional slot configuration where the number of slots per pole per phase is a non-integer, the stator winding being wound by a fractional slot winding, one of the stator core and the rotor core including a base portion and either a single position portion or plural position portions which is connected to the base portion in a third direction and which is displaced relative to the base portion in the first direction, the third direction being orthogonal to the first direction and the second direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
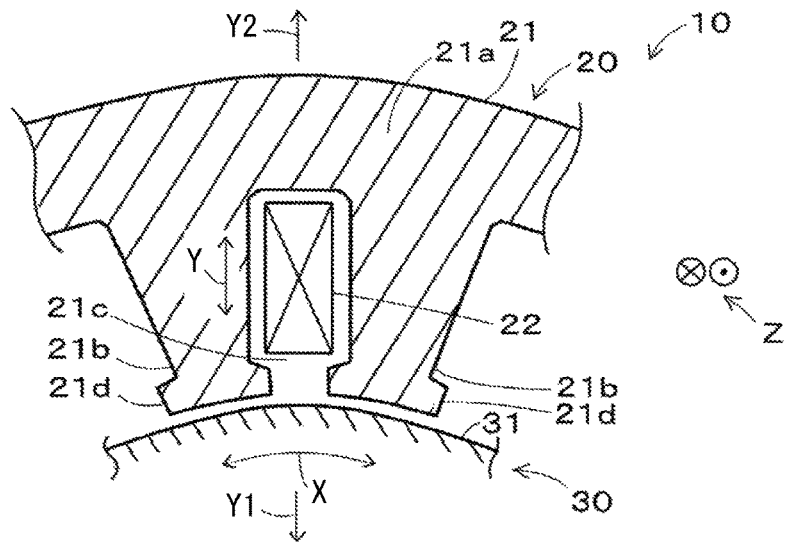
FIG. 1 is a cutting end view illustrating a portion of an end surface which is cut on a plane orthogonal to an axial direction of a rotary electric machine according to a first embodiment disclosed here.

Embodiments are explained with reference to the attached drawings. In the embodiments, common reference numerals are designated to common members or portions. Duplicate explanations are omitted from and after the second embodiments. The attached drawings are schematically illustrated and thus dimensions of detailed configurations are not specified.

A first embodiment is explained with reference to FIGS. 1 to 12. As illustrated in FIG. 1, a rotary electric machine (an electric motor) 10 includes a stator 20 and a rotor 30. The stator 20 includes a stator winding 22 which is inserted to be positioned within plural slots 21c formed at a stator core 21. The rotary electric machine 10 in the present embodiment serves as an 8-pole 60-slot rotary electric machine. The number of slots per pole per phase is 2.5. That is, the stator 20 of the embodiment includes a fractional slot configuration where the number of slots per pole per phase is a non-integer.

The rotor 30 is movably (specifically, rotatably in the embodiment) supported relative to the stator 20. The rotor 30 includes a rotor core 31 at which plural pairs of rotor poles (magnetic poles) 32a and 32b are provided. The pair of the rotor poles 32a and 32b includes different polarities from each other. The rotor core 31 includes two portions in an axial direction of the rotary electric machine 10, which is explained later. At each of the aforementioned two portions, four pairs of the rotor poles 32a and 32b are provided.

Here, a moving direction (i.e., rotating direction) of the rotor 30 relative to the stator 20 is specified to be a first direction (i.e., arrow X direction). A direction in which the stator 20 and the rotor 30 face each other is specified to be a second direction (i.e., arrow Y direction). A direction orthogonal to both the first direction and the second direction is specified to be a third direction (i.e., arrow Z direction). As illustrated in FIG. 1, the rotary electric machine 10 of the embodiment is a radial gap type cylindrical rotary electric machine so that the stator 20 and the rotor 30 are arranged coaxially with each other. Thus, the first direction (arrow X direction) corresponds to a circumferential direction of the rotary electric machine 10. The second direction (arrow Y direction) corresponds to a radial direction of the rotary electric machine 10. The third direction (arrow Z direction) corresponds to an axial direction of the rotary electric machine 10.

The stator core 21 may be formed by a known member used for a known rotary electric machine. Specifically, the stator core 21 is formed by plural magnetic steel plates each of which includes a thin plate form (for example, silicon steel plates) laminated in the axial direction (in the third direction corresponding to the arrow Z direction). The stator core 21 includes a yoke portion 21a and plural teeth portions 21b (specifically, sixty teeth portions 21b in the first embodiment, for example) integrally formed with the yoke portion 21a.

The yoke portion 21a extends along the circumferential direction (along the first direction corresponding to the arrow X direction) of the stator core 21. The plural (i.e., sixty) teeth portions 21b are formed to protrude towards an axis of the rotary electric machine 10 from the yoke portion 21a. The plural slots 21c are formed at the stator core 21, specifically, each slot 21c is formed between the teeth portions 21b, 21b adjacent to each other. The stator winding 22 is configured to be inserted to and positioned within the slots 21c. An end portion 21d of each of the teeth portions 21b is formed to be elongated along the circumferential direction of the stator core 21 so that the stator winding 22 is inhibited from being dislocated from the slots 21c. In FIG. 1, a direction from a bottom side to an open side of the slot 21c is specified to be an open side in the second direction (i.e., an arrow Y1 direction). In addition, a direction from the open side to the bottom side of the slot 21c is specified to be a bottom side in the second direction (i.e., an arrow Y2 direction).

The stator winding 22 may be formed by a known member used for a known rotary electric machine. Specifically, the stator winding 22 is obtained by conductor such as copper, for example, of which surface is coated with insulating layer such as enamel, for example. A cross-section of the stator winding 22 is not limited to a specific configuration and may be any configuration. Windings including various kinds of cross-sectional configurations, such as a round wire with a circular cross section and a square wire with a polygonal cross section, for example, may be employed. In addition, parallel thin wires in which plural thin element wires are combined and gathered may be employed. With the usage of the parallel thin wires, an eddy-current loss generated at the stator winding 22 may be reduced as compared to a single wire, which improves efficiency of the rotary electric machine 10. Further, because a force for forming the winding is reduced, forming quality may be enhanced, which results in a simple manufacture of the rotary electric machine 10.

Figure 2:
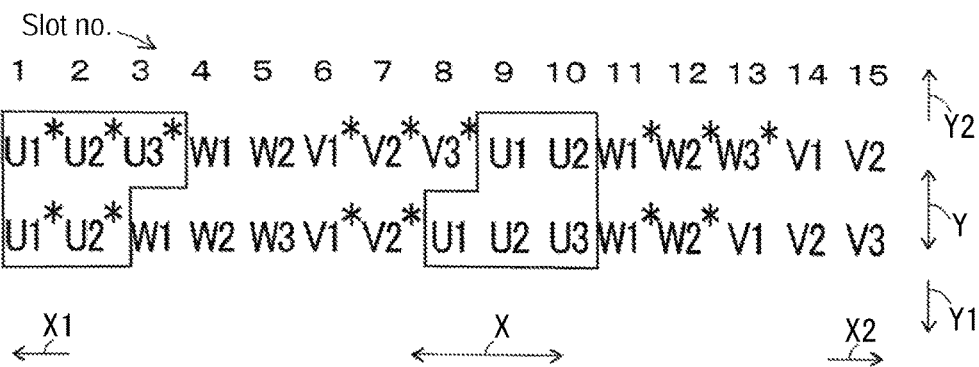
FIG. 2 is a schematic view illustrating an example of a phase arrangement for two magnetic poles (pair of magnetic poles) of the rotary electric machine illustrated in FIG. 1.

The stator winding 22 of the present embodiment is at least wound and disposed at the stator 20 including the factional slot configuration and a winding method is not limited. For example, the stator winding 22 may be wound by a known two-layer lap winding. Specifically, as illustrated in FIG. 2, the stator winding 22 is formed in two layers in the radial direction (second direction corresponding to the arrow Y direction). FIG. 2 illustrates an example of a phase arrangement for two magnetic poles (pair of magnetic poles) of the rotary electric machine 10 illustrated in FIG. 1. As mentioned above, the rotary electric machine 10 of the present embodiment is the 8-pole 60-slot rotary electric machine where the number of poles (magnetic poles) of the rotor 30 is eight and the number of slots of the stator 20 is sixty, i.e., the rotary electric machine including a base configuration where the number of poles of the rotor 30 is two and the number of slots of the stator 20 is fifteen. FIG. 2 illustrates an example of the stator winding 22 for three phases. FIG. 2 illustrates the three phases constituted by a U-phase, a V-phase and a W-phase which are 120 electrical degrees out of phase with one another. The U-phase includes a U1-phase, a U2-phase and a U3-phase, for example. The U1-phase, the U2-phase and the U3-phase are out of phase by one pitch of a stator pole pitch in the circumferential direction. The U1-phase, the U2-phase and the U3-phase are in the same phase (i.e., U-phase) but arrangements of the U1-phase, the U2-phase and the U3-phase at the stator 20 are different from one another. The aforementioned conditions are also applied to the V-phase (V1, V2 and V3 phases) and the W-phase (W1, W2 and W3 phases).

In FIG. 2, a power supply direction of the stator winding 22 is indicated on a basis of an illustration of an asterisk. Specifically, the power supply direction of the stator winding 22 for the phase indicated with the asterisk is opposite from the power supply direction of the stator winding 22 for the phase not indicated with the asterisk. In the rotary electric machine 10 of the present embodiment, the number of slots per pole per phase is 2.5. Therefore, the number of the same phases adjacent to each other in the circumferential direction (first direction, arrow X direction) is two or three, i.e., two and three as the number of the same phases are alternately repeated. The stator winding 22 for the three phases may be connected in a Y-connection or a delta ($\Delta$) connection.

The rotor 30 is arranged at an inner side (closer to the axis of the rotary electric machine 10) of the stator 20. The rotor 30 is movably (i.e., rotatably) supported relative to the stator 20. The rotor 30 includes the rotor core 31. The rotor core 31 may be formed by a known member used for a known rotary electric machine. Specifically, the rotor core 31 is formed by plural magnetic steel plates each of which includes a thin plate form (for example, silicon steel plates) laminated in the axial direction (in the third direction corresponding to the arrow Z direction), which results in a column form of the rotor core 31.

The rotor 30 includes the plural pairs of the rotor poles 32a and 32b including the different polarities from each other at the rotor core 31. Specifically, a magnet accommodation portion that extends in the circumferential direction of the rotor core 31 is formed at each of the portions of the rotor core 31. In the magnet accommodation portion, permanent magnets of which the number conforms to the predetermined number of magnetic poles (in the embodiment, eight poles) are embedded so that the rotor 30 is rotatable by a rotating magnetic field generated between the permanent magnets and the stator 20. In the disclosure, the rotor pole 32a serves as a rotor pole (permanent magnet) including one of the polarities (for example, N-pole) while the rotor pole 32b serves as a rotor pole (permanent magnet) including the other of the polarities (for example, S-pole).

The permanent magnet may be formed by a known member used for a known rotary electric machine. For example, the permanent magnet may be made of a ferrite magnet or a rare-earth magnet. A method of manufacturing the permanent magnet is not limited. For example, the permanent magnet may be made of a resin bond magnet or a sintered magnet. The resin bond magnet is obtained by a mixture of ferrite base magnetic powder and resin, for example, the mixture being cast to the rotor core 31 by injection molding. The sintered magnet is obtained by rare-earth base magnetic powder which is press-formed within a magnetic field and burnt and baked at a high temperature (sintered). The rotor poles 32a and 32b are thus formed at the rotor core 31 by the permanent magnets.

Figure 3:
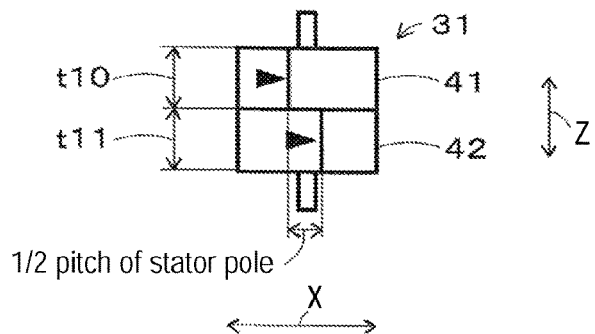
FIG. 3 is a schematic view illustrating a positional relation in a circumferential direction between a base portion and a position portion provided at a rotor core illustrated in FIG. 1.

As illustrated in FIG. 3, one of the stator core 21 and the rotor core 31 (in the present embodiment, the rotor core 31) includes a base portion 41 and a single position portion 42. The position portion 42 is connected to the base portion 41 in the axial direction (in the third direction corresponding to the arrow Z direction) and is displaced in the circumferential direction (in the first direction corresponding to the arrow X direction) relative to the base portion 41. In FIG. 3, a state where the position portion 42 is displaced in the circumferential direction relative to the base portion 41 is schematically indicated with filled triangles. In the present embodiment, a skew amount of the position portion 42 relative to the base portion 41 is specified to be one half (½) pitch of the stator pole pitch.

The four pairs of the rotor poles 32a and 32b are provided at the base portion 41 at even intervals in the circumferential direction. In addition, the four pairs of the rotor poles 32a and 32b are provided at the position portion 42 at even intervals in the circumferential direction. Accordingly, the rotor core 32 in the present embodiment includes two portions in the axial direction of the rotary electric machine 10 so that the four pairs of the rotor poles 32a and 32b are provided at each of the portions.

Figure 4:
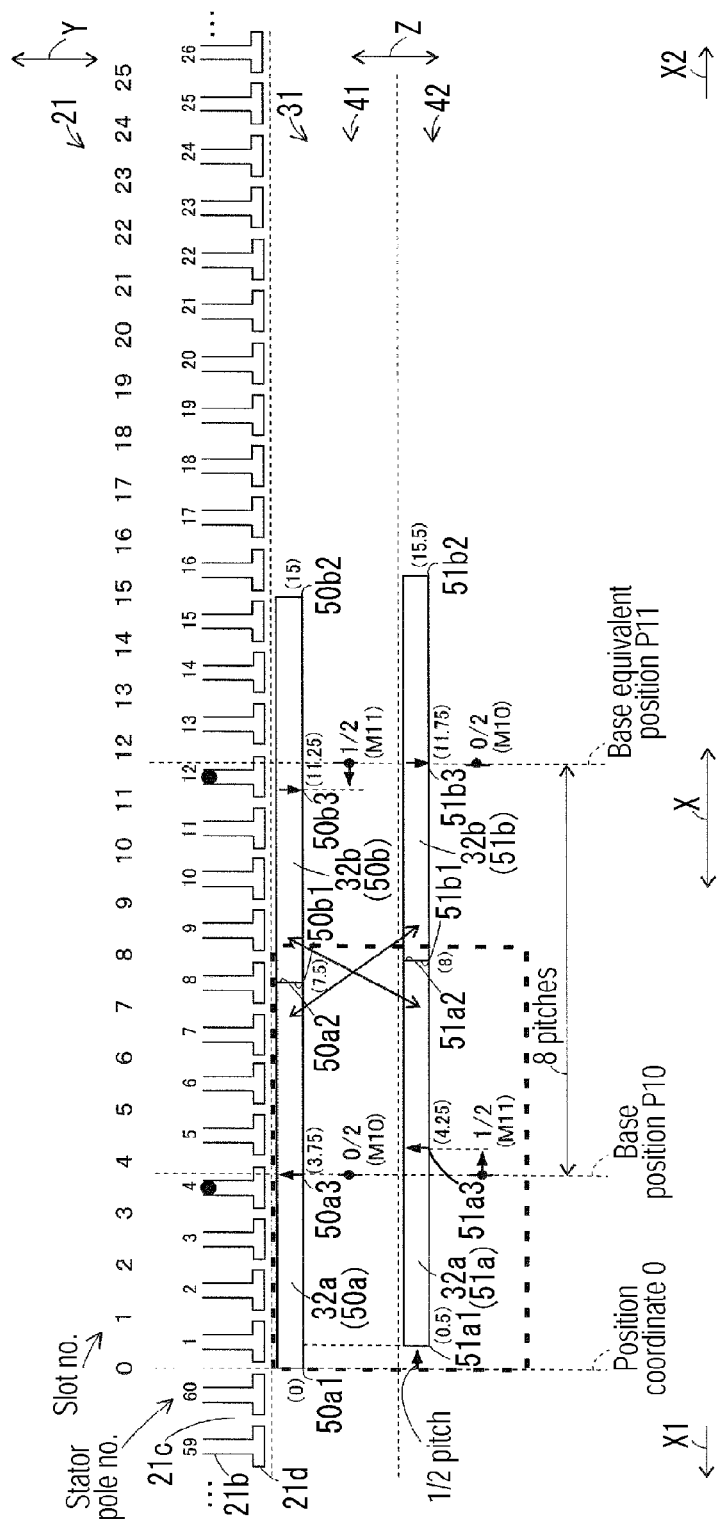
FIG. 4 is a schematic view illustrating a pole facing state between rotor poles and stator poles according to the first embodiment.

In FIG. 4, the stator core 21 in an annular form is illustrated in a linearly deployed manner. The stator core 21 as viewed in the axial direction is illustrated. In FIG. 4, illustrations of the yoke portion 21a and the stator winding 22 are omitted. Identification numbers for poles formed at the stator core 21 (hereinafter referred to as stator poles) are designated to the respective teeth portions 21b. The aforementioned identification numbers are hereinafter referred to as stator pole numbers. In the disclosure, for convenience of explanation, a center position of the slot 21c between a stator pole number 60 and a stator pole number 1 is specified to be a basis of a position (i.e., position coordinate is 0) of the rotor poles 32a and 32b.

In FIG. 4, the rotor core 31 in a tubular form is illustrated in a linearly deployed manner. The rotor core 31 as viewed in the radial direction is illustrated. In FIG. 4, one pair of the rotor poles 32a and 32b provided at the base portion 41 and one pair of the rotor poles 32a and 32b provided at the position portion 42 are illustrated. Illustrations of another pair of the rotor poles 32a and 32b provided at each of the base portion 41 and the position portion 42 are omitted.

The rotary electric machine 10 of the embodiment serves as the 8-pole 60-slot rotary electric machine. The number of slots per pole is 7.5. In FIG. 4, a base equivalent interval of the stator 20 (i.e., an interval between a base position P10 and a base equivalent position P11) is specified to be the nearest integer number obtained by a round-off (i.e., by counting fractions over ½ as one and disregarding the rest) of the number of slots per pole in the stator pole pitch (in the present embodiment, 7.5). In the present embodiment, the base equivalent interval is therefore eight (eight pitches). FIG. 4 illustrates the pole facing state between the stator poles with the base equivalent interval of eight in the stator pole pitch and the rotor poles 32a, 32b. In FIG. 4, each filled circle attached to each of the teeth portions 21b designated by the stator pole numbers 4 and 12 indicates a pole center position of the stator poles within the base equivalent interval. In FIG. 4, only the base equivalent position P11 is illustrated, however, the base equivalent position is obtained at positions away from the base position P10 by the integral multiple of the nearest integer number (i.e., integral multiple of eight, in this case) obtained by the round-off of the number of slots per pole. With the base equivalent positions, the respective pole facing states between the stator poles and the rotor poles 32a and 32b are equivalent to one another. Detailed positions of the base position P10 and the base equivalent position P11 are explained later.

Here, the rotor pole 32a in one pair of the rotor poles 32a and 32b provided at the base portion 41 illustrated in FIG. 4 is specified to be a base rotor pole 50a and the rotor pole 32b in the aforementioned pair of the rotor poles 32a and 32b is specified to be a base rotor pole 50b. In addition, the rotor pole 32a in one pair of the rotor poles 32a and 32b provided at the position portion 42 illustrated in FIG. 4 is specified to be a first rotor pole 51a and the rotor pole 32b in the aforementioned pair of the rotor poles 32a and 32b is specified to be a first rotor pole 51b.

The base rotor pole 50a includes first and second end portions 50a1 and 50a2 in the circumferential direction. The first end portion 50a1 (of which position coordinate is 0) faces a center position of one of the slots 21c. On the other hand, the second end portion 50a2 (of which position coordinate is 7.5) faces a center position of one of the teeth portions 21b. Thus, a pole center position 50a3 (of which position coordinate is 3.75) of the base rotor pole 50a is displaced to a right side in FIG. 4 in the first direction (arrow X2 direction) relative to the pole center position of the stator poles within the base equivalent interval (i.e., teeth portion 21b designated by the stator pole number 4).

Figure 5:
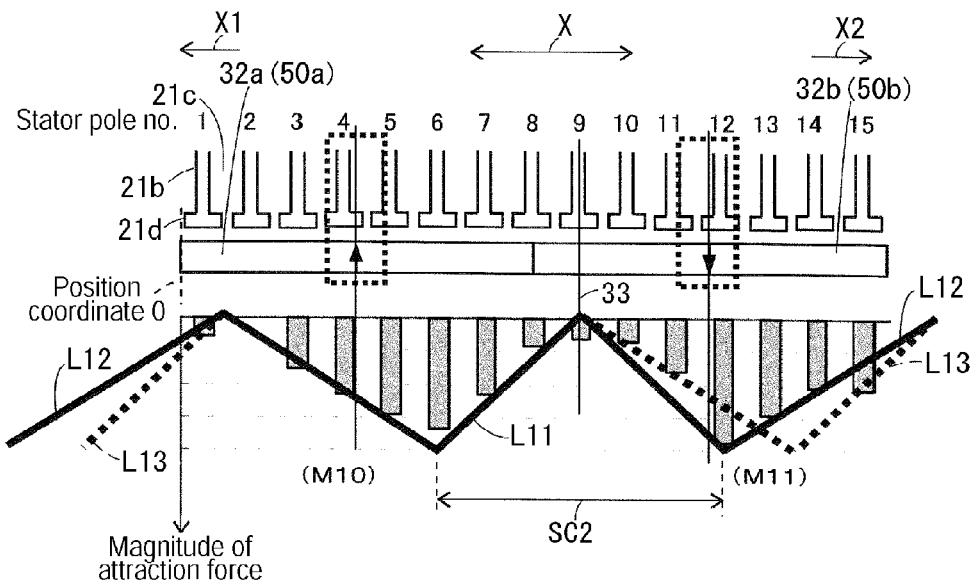
FIG. 5 is a schematic view illustrating an example of magnetic attraction distribution of the rotor poles in a radial direction according to a reference embodiment disclosed here.

As a result, distribution of magnetic attraction force of the base rotor pole 50a generated in the radial direction and applied to the respective stator poles (hereinafter simply referred to as attraction distribution of the base rotor pole 50a) is indicated by a bar graph in FIG. 5. FIG. 5 is a schematic view illustrating an example of the attraction distribution of the rotor poles 32a and 32b according to a reference embodiment. In the reference embodiment, the rotor core 31 only includes the base portion 41 and does not include the position portion 42.

The bar graph in FIG. 5 indicates the attraction distribution of the rotor poles 32a and 32b (base rotor poles 50a and 50b) according to the reference embodiment. The aforementioned attraction distribution and attraction distribution explained later may be acquired by a magnetic field analysis, for example. A solid line L11 indicates an approximate straight line which is obtained by approximating the distribution of the attraction force of the base rotor pole 50a applied to the respective stator poles indicated by the bar graph. As illustrated in FIG. 5, a peak value in the attraction distribution of the base rotor pole 50a is displaced to the right side in FIG. 5 in the first direction (arrow X2 direction) relative to the pole center position of the stator poles within the base equivalent interval (i.e., the teeth portion 21b designated by the stator pole number 4). Such the pole facing state is referred to as a pole facing state M10.

The base rotor pole 50b illustrated in FIG. 4 includes first and second end portions 50b1 and 50b2 in the circumferential direction. The first end portion 50b1 (of which position coordinate is 7.5) faces a center position of one of the teeth portions 21b. On the other hand, the second end portion 50b2 (of which position coordinate is 15) faces a center position of one of the slots 21c. Thus, a pole center position 50b3 (of which position coordinate is 11.25) of the base rotor pole 50b is displaced to a left side in FIG. 4 in the first direction (arrow X1 direction) relative to the pole center position of the stator poles within the base equivalent interval (i.e., the teeth portion 21b designated by the stator pole number 12).

As a result, the attraction distribution of the base rotor pole 50b is indicated by the bar graph in FIG. 5. A solid line L12 indicates an approximate straight line which is obtained by approximating the distribution of the attraction force of the base rotor pole 50b applied to the respective stator poles indicated by the bar graph. As illustrated in FIG. 5, a peak value in the attraction distribution of the base rotor pole 50b is substantially positioned at the pole center position of the stator poles within the base equivalent interval (i.e., the teeth portion 21b designated by the stator pole number 12). Such the pole facing state is referred to as a pole facing state M11.

Accordingly, the rotary electric machine 10 of ½ series (in a classification where a decimal portion of the number of slots per pole per phase 2.5, i.e., 0.5, is represented by an irreducible fraction, which is explained in detail later) includes two kinds (types) of pole facing states, i.e., the pole facing state M10 and the pole facing state M11, and includes two kinds (types) of attraction distributions. Therefore, the rotor poles 32a and 32b in the pair (base rotor poles 50a and 50b) adjacent to each other in the circumferential direction include the different attraction distributions from each other. As a result, the attraction distribution is inhibited from being equivalent on the basis of the single pole (rotor pole 32a, 32b) and is equivalent on the basis of a pair of the rotor poles 32a and 32b (i.e., every other pole). Such the state is also applied to the other pair of the rotor poles 32a and 32b. The ½ series rotary electric machine 10 achieves a multipolar (in the present embodiment, 8-pole) rotary electric machine based on a parallel displacement of one pair of the rotor poles 32a and 32b adjacent to each other in the first direction and including the different attraction distributions from each other.

As illustrated in FIG. 5, two kinds of the attraction distributions, i.e., the pole facing state M10 and the pole facing state M11, are substantially symmetric (mirror-symmetric) about a mirror surface 33. The mirror surface 33 is an imaginary reference surface formed in the radial direction (second direction corresponding to the arrow Y direction) and in the axial direction (third direction corresponding to the arrow Z direction). For example, in a case where the mirror surface 33 is formed at a center position of the teeth portion 21*b* designated by the stator pole number 9, the attraction distributions of the rotor poles 32*a* and 32*b* (base rotor poles 50*a* and 50*b*) in one pair are substantially symmetric (mirror-symmetric) about the mirror surface 33. That is, the pole facing state M10 and the pole facing state M11 are symmetric (mirror-symmetric) about the mirror surface 33. Therefore, the solid Line 11 when being bent relative to the mirror surface 33 substantially matches the solid line L12. Such the state is also applied to the other pair of the rotor poles 32*a* and 32*b*. A broken line L13 in FIG. 5 is a line obtained by moving the solid line L11 to the right side in FIG. 5 in the first direction (arrow X2 direction) by one rotor pole pitch.

Figure 6:
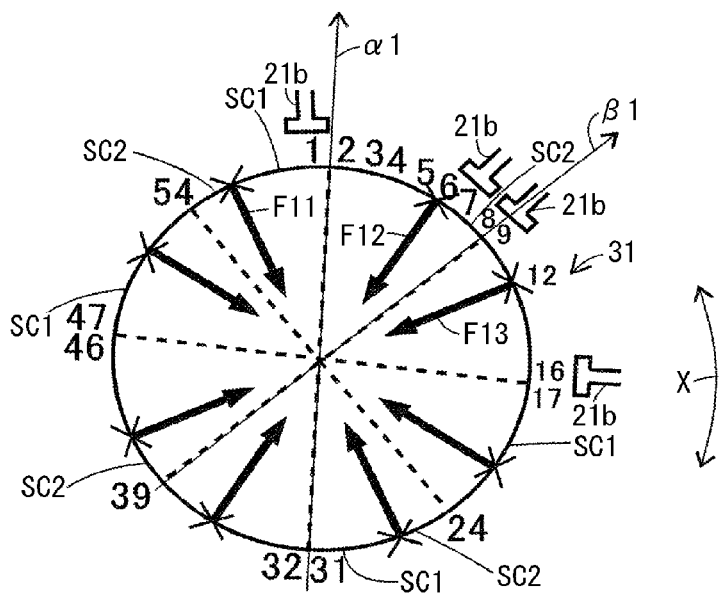
FIG. 6 is a schematic view illustrating distribution of peak values of attraction forces of the rotor poles according to the reference embodiment.

Next, a vibratory force in the reference embodiment where the rotor core 31 only includes the base portion 41 and does not include the position portion 42 is explained. As mentioned above, the peak value in the attraction distribution of the base rotor pole 50*a* illustrated in FIG. 5 is displaced to the right side in FIG. 5 in the first direction (arrow X direction) relative to the pole center position of the stator pole within the base equivalent interval (teeth portion 21*b* designated by the stator pole number 4). On the other hand, the peak value in the attraction distribution of the base rotor pole 50*b* is substantially positioned at the pole center position of the stator pole within the base equivalent interval (teeth portion 21*b* designated by the stator pole number 12). Therefore, as illustrated in FIG. 6, a first interval SC1 and a second interval SC2 are repeated alternately as intervals between the peak values of the attraction forces of the rotor poles 32*a* and 32*b* adjacent to each other in the circumferential direction. The second interval SC2 is shorter in distance than the first interval SC1 in the circumferential direction, i.e., the interval between the peak values of the attraction forces of the rotor poles 32*a* and 32*b* adjacent to each other in the circumferential direction is narrow. A length of each arrow in FIG. 6 indicates the magnitude of each of the peak values of the attraction forces of the rotor poles 32*a* and 32*b*. The peak values of the attraction forces of the rotor poles 32*a* and 32*b* are substantially the same as each other. Numbers illustrated in FIG. 6 partially indicate the stator pole numbers.

Figure 7:
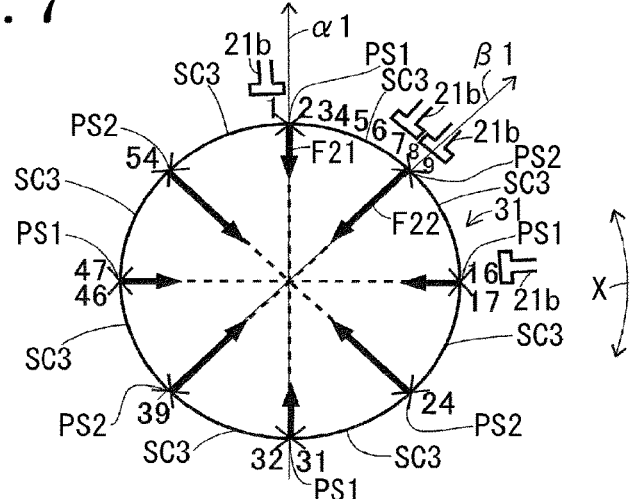
FIG. 7 is a schematic view illustrating the distribution of the peak values of the attraction forces of the rotor poles in FIG. 6 on coordinate axes at a constant pitch in the circumferential direction.

The distribution of the peak values of the respective attraction forces of the rotor poles 32*a* and 32*b* is also illustrated in FIG. 7. In FIG. 7, the distribution of the peak values of the attraction forces of the rotor poles 32*a* and 32*b* is indicated on coordinate axes at a constant pitch (third interval SC3) in the circumferential direction. A length of each arrow in FIG. 7 indicates the magnitude of each of the peak values of the attraction forces of the rotor poles 32*a* and 32*b*. Numbers illustrated in FIG. 7 partially indicate the stator pole numbers. The peak values of the rotor poles 32*a* and 32*b* are different from each other in the circumferential direction, i.e., a first position PS1 and a second position PS2 at which the peak values are different from each other are alternately repeated. At the second position PS2, the peak value of the attraction force of the rotor poles 32*a*, 32*b* is greater than the peak value of the attraction force of the rotor poles 32*a*, 32*b* at the first position PS1.

For example, a coordinate axis α1 in FIG. 6 passes through a center position of the slot 21*c* between the teeth portions 21*b* designated by the stator pole numbers 1 and 2 and extends in the radial direction. A coordinate axis β1 passes through a center position of the teeth portion 21*b* designated by the stator pole number 9 and extends in the radial direction. As illustrated in FIGS. 6 and 7, an angle formed between the coordinate axis α1 and the coordinate axis β1 is 45° (mechanical degrees). The coordinate axis α1 and the coordinate axis β1 form a constant pitch (i.e., third interval SC3).

An attraction force F21 on the coordinate axis α1 in FIG. 7 is formed by an attraction force F11 and an attraction force F12 in FIG. 6. An attraction force F22 on the coordinate axis β1 in FIG. 7 is formed by the attraction force F12 and an attraction force F13 in FIG. 6. Thus, for example, the attraction force F21 is twice as large as a component in the direction of the coordinate axis α1 of the attraction force F12. The attraction force F22 is twice as larger as a component in the direction of the coordinate axis β1 of the attraction force F12.

Figure 8:
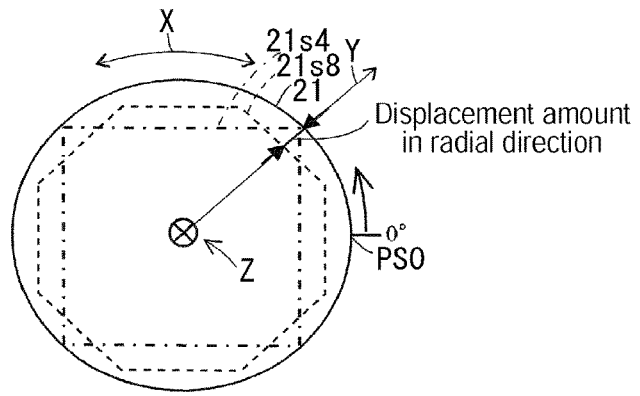
FIG. 8 is a schematic view schematically illustrating a state of a displacement of an outer circumference of a stator core according to the reference embodiment.

The attraction forces of the rotor poles 32*a* and 32*b* including the different peak values from each other include a component of vibratory force of a smaller order (in the present embodiment, a fourth order rotation) than a component of vibratory force of an order which relies on the number of poles of the rotor 30 (in the embodiment, 8 poles) (i.e., an eighth order rotation in the present embodiment) relative to the stator core 21. As illustrated in FIG. 8, in a case where the attraction forces of the rotor poles 32*a* and 32*b* are applied to the stator core 21, an outer circumference (outer circumferential portion) of the stator core 21 tends to deform into a configuration illustrated with each broken line. Specifically, in a case where the respective attraction forces applied to the stator core 21 are equivalent to each other, the outer circumference tends to deform into an octagon 21*s*8 in a dashed line. On the other hand, in a case where the peak values of the attraction forces are inhibited from being equivalent to each other, i.e., in a case where the peak value of the attraction force is inhibited from being equivalent with respect to the single pole and is equivalent with respect to every other pole, the outer circumference tends to be deformed into a square 21*s*4 in an alternate long and short dash line. FIG. 8 illustrates the configuration of the outer circumference of the stator core 21 as viewed in the axial direction (third direction, arrow Z direction). The outer circumferential configuration of the stator core 21 before its deformation is indicated by a solid line while the outer circumferential configuration of the stator core 21 after its deformation is indicated by the broken lines (i.e., the octagon 21*s*8 and the square 21*s*4). A base position PS0 is specified in the circumference direction in FIG. 8.

A displacement amount of the outer circumference of the stator core 21 in the radial direction at a moment when the rotary electric machine 10 of the reference embodiment is driven at a constant speed and a constant torque (such the displacement amount is hereinafter referred to as a static displacement amount of the stator core 21) is, for example, illustrated in FIG. 9. A horizontal axis in FIG. 9 indicates mechanical degrees in a state where the base position PS0 in FIG. 8 is specified to be zero (0°). A vertical axis in FIG. 9 indicates the static displacement amount of the stator core 21 indicated by the broken line in FIG. 8 (i.e., square 21*s*4) in a state where the static displacement amount of the stator core 21 indicated by the solid line in FIG. 8 is specified to be zero.

Figure 9:
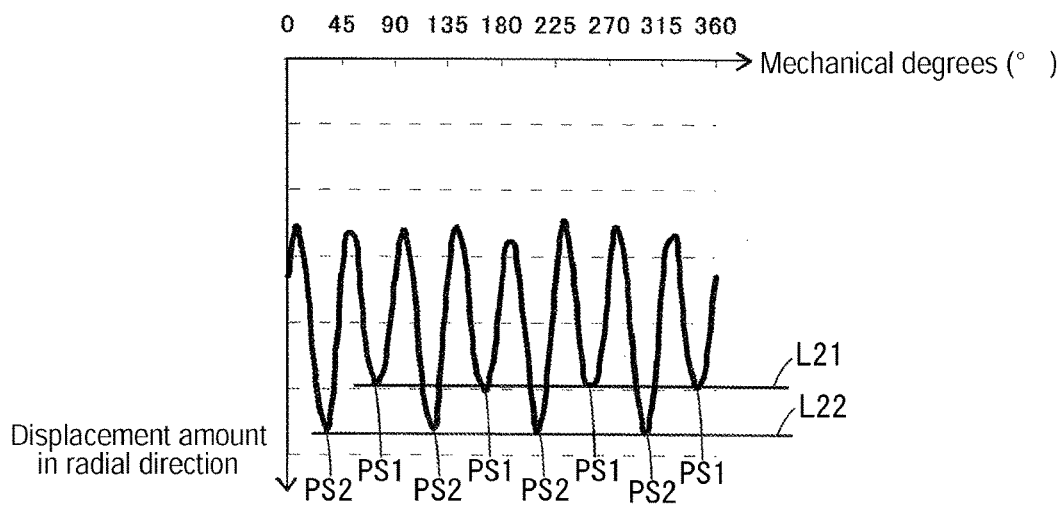
FIG. 9 is a schematic view schematically illustrating a static displacement amount of the stator core in the radial direction according to the reference embodiment.

As illustrated in FIG. 9, according to the rotary electric machine 10 of the reference embodiment, the static displacement amount of the stator core 21 achieves a local maximum value at each of the first position PS1 and the second position PS2. At this time, specifically, the static displacement amount of the stator core 21 at the second position PS2 is greater than the static displacement amount of the start core 21 at the first position PS1. In addition, because the first position PS1 and the second position PS2 are alternately repeatedly obtained, the static displacement amount of the stator core 21 generates two kinds of peak values (local maximum values) including different magnitudes from each other. A line (straight line) L21 indicates the peak value of the static displacement amount of the stator core 21 at the first position PS1. A line (straight line) L22 indicates the peak value of the static displacement amount of the stator core 21 at the second position PS2.

Accordingly, in the ½ series rotary electric machine 10, the static displacement amount of the stator core 21 includes two kinds of the peak values including the different magnitudes from each other. Thus, the ½ series rotary electric machine 10 includes the component of the vibratory force of the $4^{th}$ order rotation. The vibratory force of the $4^{th}$ order rotation is repeated with the single pair of magnetic poles of the rotor (i.e., two magnetic poles). The static displacement amount of the stator core 21 includes the four peak values in one round in the circumferential direction. In a case of the 8-pole rotary electric machine 10 in which the stator 20 is formed in an integral slot configuration, the rotary electric machine 10 includes the component of the vibratory force of the $8^{th}$ order rotation. The vibratory force of the $8^{th}$ order rotation relies on the number of poles of the rotor 30 (in this case, 8 poles), and is repeated on the basis of the single magnetic pole. In addition, in one round in the circumferential direction, the static displacement amount of the stator core 21 includes the eighth peak values.

In the rotary electric machine 10 in which the stator 20 includes the fractional slot configuration, the component of the vibratory force of a smaller order (in the present embodiment, the $4^{th}$ order rotation) than the component of the vibratory force of the order which relies on the number of poles of the rotor 30 (in the embodiment, 8 poles) (i.e., the $8^{th}$ order rotation in the present embodiment) is obtained. Thus, in the rotary electric machine 10 including a wide range of drive rotation numbers, the number of rotations that matches a natural frequency of vibration of the stator core 21 is likely to be generated within the range of drive rotation numbers. As a result, a resonance of the stator 20 occurs, which may increase noise and vibration generated upon driving of the rotary electric machine 10.

According to the rotary electric machine 10 of the present embodiment, the stator core 21 or the rotor core 31 (in the present embodiment, the rotor core 31) includes the base portion 41 and the position portion 42. The skew amount of the position portion 42 relative to the base portion 41 is specified to be one half (½) pitch of the stator pole. Accordingly, in the rotary electric machine 10 of the present embodiment, a high order (in the present embodiment, the $8^{th}$ order rotation) substantially the same level as a case where a stator is formed in the integral slot configuration is obtained in the distribution of the attraction force. The number of rotations that matches the natural frequency of vibration of the stator core 21 increases so as to fall out of the range of drive rotation numbers of the rotary electric machine 10. Specifically, according to the rotary electric machine 10 of the present embodiment, an opportunity of resonance of the stator 20 is avoidable to thereby decrease at least one of the noise and vibration that is generated upon driving of the rotary electric machine 10. Detailed explanation is made with reference to FIGS. 4, 5, 10A, 10B and 10C.

Figure 10A:
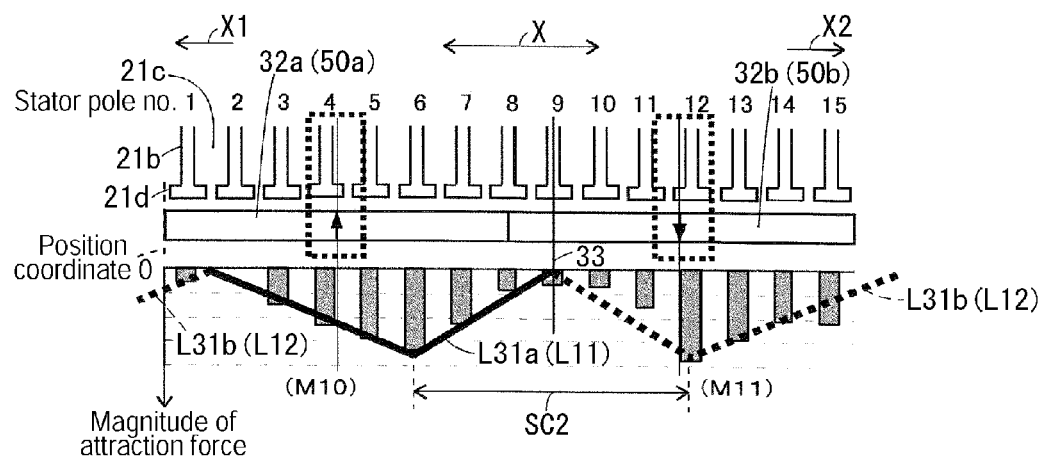
FIG. 10A is a schematic view schematically illustrating an example of magnetic attraction distribution of base rotor poles in the radial direction according to the first embodiment.

As illustrated in FIG. 10A, the attraction distribution of the base rotor poles 50a and 50b is substantially equal to the attraction distribution illustrated in FIG. 5 except that each of the attraction forces is reduced overall. A solid line L31a and a broken line L31b are approximate straight lines which are obtained by approximating the distribution of the attraction forces applied to the respective stator poles indicated by a bar graph. The solid line L31a corresponds to the solid line L11 in FIG. 5 and the broken line L31b corresponds to the solid line L12 in FIG. 5.

The position portion 42 is connected to the base portion 41 in the axial direction (third direction, arrow Z direction) and is displaced relative to the base portion 41 in the circumferential direction (first direction, arrow X direction). In the present embodiment, the skew amount of the position portion 42 relative to the base portion 41 is specified to be ½ pitch. Accordingly, as illustrated in FIG. 4, the first rotor poles 51a and 51b are displaced relative to the base rotor poles 50a and 50b by a half (½) pitch in the circumferential direction.

Specifically, the first rotor pole 51a includes first and second end portions 51a1 and 51a2 in the circumferential direction. The first end portion 51a1 (of which position coordinate is 0.5) faces a center position of one of the teeth portions 21b. The second end portion 51a2 (of which position coordinate is 8.0) faces a center position of one of the slots 21c. A pole center position 51a3 (of which position coordinate is 4.25) of the first rotor pole 51a is displaced to a left side in FIG. 4 in the first direction (arrow X1 direction) relative to the teeth portion 21b designated by the stator pole number 5.

Thus, the pole facing state of the first rotor pole 51a is substantially equal to the pole facing state M11 serving as the pole facing state of the base rotor pole 50b. That is, the attraction distribution of the first rotor pole 51a is equivalent to the attraction distribution of the base rotor pole 50b. In FIG. 4, the first rotor pole 51a and the base rotor pole 50b are connected to each other by an arrow. The arrow indicates that one of the rotor poles (for example, the first rotor pole 51a) matches the other of the rotor poles (for example, the base rotor pole 50b) including the equivalent attraction distribution in a case where one of the rotor poles is shifted in parallel. In the drawings which are mentioned below, an arrow connecting two rotor poles indicates a relation therebetween in the same way as above.

Figure 10B:
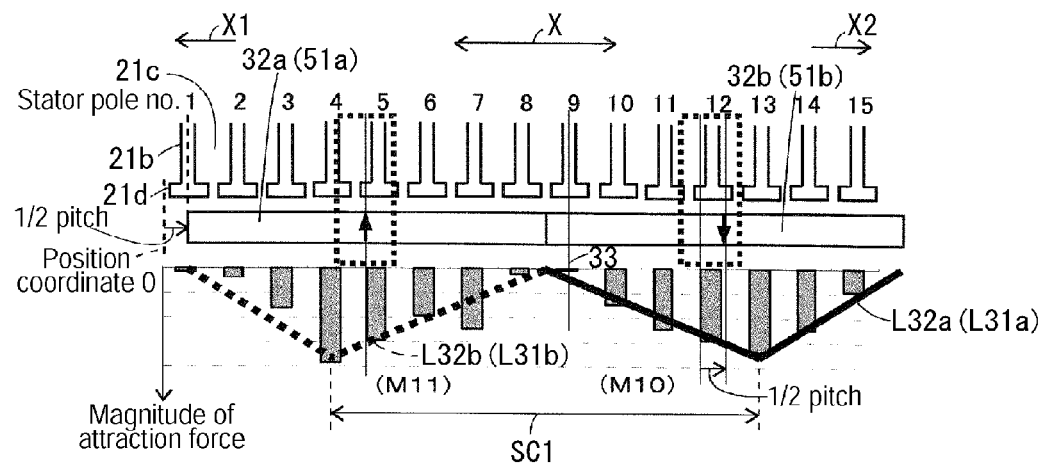
FIG. 10B is a schematic view schematically illustrating an example of magnetic attraction distribution of first rotor poles in the radial direction according to the first embodiment.
Figure 10C:
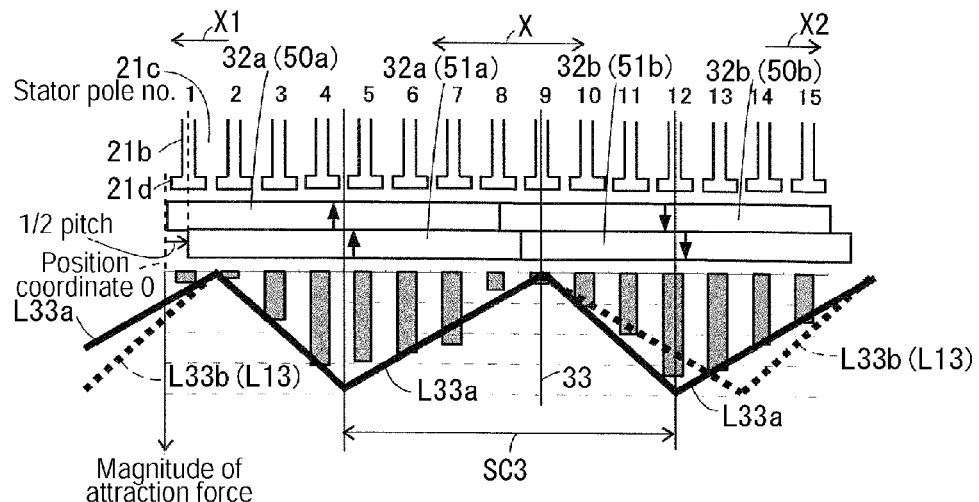
FIG. 10C is a schematic view schematically illustrating an example of magnetic attraction distribution where the magnetic attraction distribution of the base rotor poles illustrated in FIG. 10A and the magnetic attraction distribution of the first rotor poles illustrated in FIG. 10B overlap each other.

As illustrated in FIG. 10B, the attraction distribution of the first rotor pole 51a is substantially equal to the attraction distribution of the base rotor pole 50b illustrated in FIG. 10A. A broken line L32b in FIG. 10B is an approximate straight line obtained by approximating the distribution of the attraction force applied to the respective stator poles indicated by a bar graph. The broken line L32b corresponds to the broken line L31b in FIG. 10A. Overlapping the attraction distribution of the base rotor pole 50a and the attraction distribution of the first rotor pole 51a (i.e., adding two kinds of the attraction forces for each of the stator poles) achieves the attraction distribution of the base rotor pole 50a and the first rotor pole 51a illustrated in FIG. 10C. A solid line L33a in FIG. 10C is an approximate straight line obtained by approximating the distribution of the attraction force applied to the respective stator poles indicated by a bar graph. The solid line L33a indicates that the attraction distribution of the base rotor pole 50a and the attraction distribution of the first rotor pole 51a are mixed to thereby obtain averaging attraction distribution.

The aforementioned state is also achieved in a case where the attraction distribution of the base rotor pole 50b and the attraction distribution of the first rotor pole 51b overlap each other. The base rotor pole 50b is disposed adjacent to (connected to) the base rotor pole 50a in the circumferential direction (first direction, arrow X direction) and the first rotor pole 51b is disposed adjacent to (connected to) the first rotor pole 51a in the circumferential direction. In addition, the aforementioned state is also applied to the other pairs of the rotor poles 32a and 32b adjacent in the circumferential direction. A solid line L32a in FIG. 10B is an approximate straight line obtained by approximating the distribution of the attraction force of the first rotor pole 51b applied to the respective stator poles indicated by a bar graph. The solid line L32a corresponds to the solid line L31a in FIG. 10A. A broken line L33b in FIG. 10C corresponds to the broken line L13 in FIG. 5. Regions surrounded and defined by broken lines in FIGS. 5, 10A and 10B indicate differences in the facing state between the stator poles and the rotor poles 32a, 32b.

According to the rotary electric machine 10 of the embodiment, either the stator core 21 or the rotor core 31 (in the present embodiment, the rotor core 31) includes the base portion 41 and the position portion 42. The skew amount of the position portion 42 relative to the base portion 41 is specified to be ½ pitch. Accordingly, the distribution of the magnetic attraction forces of the rotor poles 32a, 32a (for example, the base rotor pole 50a and the first rotor pole 51a) adjacent to each other in the axial direction (third direction, arrow Z direction) is mixed in the radial direction to thereby obtain the averaging attraction distribution. Such the state is also applied to the rotor poles 32b, 32b (for example, the base rotor pole 50b and the first rotor pole 51b) adjacent to each other in the axial direction. As a result, the attraction distribution of the rotor pole 32a and the attraction distribution of the rotor pole 32b are substantially equivalent to each other or approach a substantially equivalent state, i.e., the attraction distribution is substantially equivalent with respect to the single pole.

Figure 11:
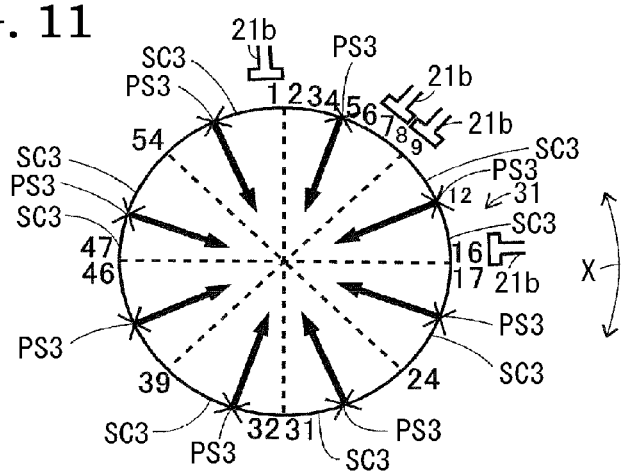
FIG. 11 is a schematic view illustrating the distribution of the peak values of the attraction forces of the rotor poles according to the first embodiment.
Figure 12:
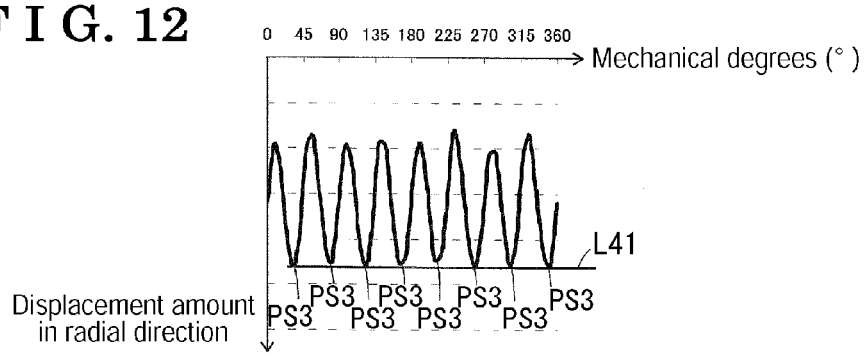
FIG. 12 is a schematic view schematically illustrating a static displacement amount of the stator core in the radial direction according to the first embodiment.

Specifically, as illustrated in FIG. 11, the respective peak values of the attraction forces of the rotor poles 32a and 32b are substantially the same as each other and are obtained at a constant pitch in the circumferential direction. The interval of the adjacent peak values of the attraction forces is the same as the third interval SC3 which is mentioned above. The position where the peak value is obtained is indicated by a third position PS3 in FIG. 11. In addition, the peak values in the static displacement amount of the stator core 21 are equalized as illustrated in FIG. 12. That is, the component of the vibratory force of the $4^{th}$ order rotation decreases and the component of the vibratory force of the $8^{th}$ order rotation increases. A line (straight line) L41 in FIG. 12 indicates the peak value in the static displacement amount of the stator core 21.

As mentioned above, according to the rotary electric machine 10 of the present embodiment, the component of the vibratory force of a smaller order (in the embodiment, the $4^{th}$ order rotation) than the component of the vibratory force of the order which relies on the number of poles of the rotor 30 (in the embodiment, 8 poles) (i.e., the $8^{th}$ order rotation in the present embodiment) decreases so that the component of the vibratory force of the order that relies on the number of magnetic poles of the rotor 30 corresponding to the number of the rotor poles 32a and 32b at the portion 41 or 42 increases. Therefore, in the rotary electric machine 10 of the present embodiment, a high order (in the present embodiment, the $8^{th}$ order rotation) substantially the same level as a case where a stator is formed in the integral slot configuration is obtained in the distribution of the attraction force. The number of rotations of the rotary electric machine 10 that matches the natural frequency of vibration of the stator core 21 thus increases. The number of rotations that matches the natural frequency of vibration of the stator core 21 may be specified out of the range of the drive rotation numbers of the rotary electric machine 10. Consequently, in the rotary electric machine 10 of the present embodiment, the opportunity of resonance of the stator 20 is avoidable to thereby reduce at least one of the noise and vibration that occurs upon the driving of the rotary electric machine 10.

Here, an integer part of the number of slots per pole per phase when the number of slots per pole per phase is represented in a mixed fraction is an integer part a, a numerator part is a numerator part b, and a denominator part is a denominator part c when a proper fraction part of the mixed fraction is represented by an irreducible fraction. In the present embodiment, because the number of slots per pole per phase is 2.5, the integer part a is 2, the numerator part b is 1, and the denominator part c is 2. In addition, the rotary electric machine 10 is described as a b/c series rotary electric machine with a usage of the numerator part b and the denominator part c in a case where the number of slots per pole per phase is represented in a mixed fraction. The rotary electric machine 10 of the present embodiment is thus the ½ series rotary electric machine 10.

Further, an average skew amount of the position portion 42 relative to the base portion 41 for decreasing at least one of the noise and vibration that occurs at the driving of the rotary electric machine 10 is a first average skew amount Sav1. At this time, as illustrated in FIG. 3, a lamination thickness t10 of the base portion 41 and a lamination thickness t11 of the position portion 42 are equal to each other. The lamination thickness t10 is a thickness of the base portion 41 in the axial direction (third direction, arrow Z direction). The lamination thickness t11 is a thickness of the position portion 42 in the axial direction. In a case where the plural position portions 42 are provided, which is explained later, the lamination thicknesses of the base portion 41 and the respective position portions 42 are equal to one another. In addition, the first average skew amount Sav1 is calculated in a state where the skew amount of the base portion 41 is zero and the skew amount 0 of the base portion 41 is included for the calculation. The first average skew amount Sav1 is the average skew amount in the stator pole pitch.

In the rotary electric machine 10 of the present embodiment, the skew amount of the position portion 42 relative to the base portion 41 is specified to be ½ pitch. Thus, the first average skew amount Sav1 is ¼ pitch (=(0+½)/2). In addition, the skew amounts of the base portion 41 and the position portion 42 in a state where the skew amount of the base portion 41 is specified to be zero is represented as 0, ½ in the stator pole pitch when being indicated in order from one of the portions at the end in the axial direction, i.e., in the present embodiment, from the base portion 41.

In FIG. 4, the pole center position 50a3 (of which position coordinate is 3.75) of the base rotor pole 50a is indicated by the base position P10. A position separated from the base position P10 by 8 poles in the stator pole pitch (8 pitches) corresponding to the base equivalent interval to the right side in FIG. 4 in the first direction is indicated by the base equivalent position P11. The pole center position of each of the base rotor poles 50a, 50b and the first rotor poles 51a, 51b may be indicated on a basis of a displacement relative to the base position P10 or the base equivalent position P11. In FIG. 4, the aforementioned pole center position is indicated on the basis of the pole pitch (in a fraction). For example, the pole center position 51a3 (of which position coordinate is 4.25) of the first rotor pole 51a is displaced to the right side in FIG. 4 in the first direction (arrow X2 direction) by ½ pitch (pole pitch) from the base position P10 (of which position coordinate is 3.75).

In FIG. 4, a displacement direction (i.e., direction of the pole center of each of the base rotor poles 50a, 50b and the first rotor poles 51a and 51b) from the base position P10 or the base equivalent position P11 is indicated by an arrow. The pole center position and first and second end positions of each of the base rotor poles 50a, 50b and the first rotor poles 51a, 51b are indicated by numerical values within parentheses. The pole facing state (i.e., pole facing state M10 or M11) between the stator poles and the rotor poles 32a, 32b is indicated within parentheses. Arrows illustrated within the rotor poles 32a and 32b indicate a difference in polarity of the rotor poles 32a and 32b. The aforementioned description method in FIG. 4 is applied to the other embodiments explained later. For convenience of space, the pole center position and first and second end positions of each of the rotor poles 32a and 32b may be indicated only by numerical values within parentheses.

A second embodiment differs from the first embodiment in the skew amount of the position portion 42 relative to the base portion 41. The difference of the second embodiment from the first embodiment is mainly explained below.

Figure 13A:
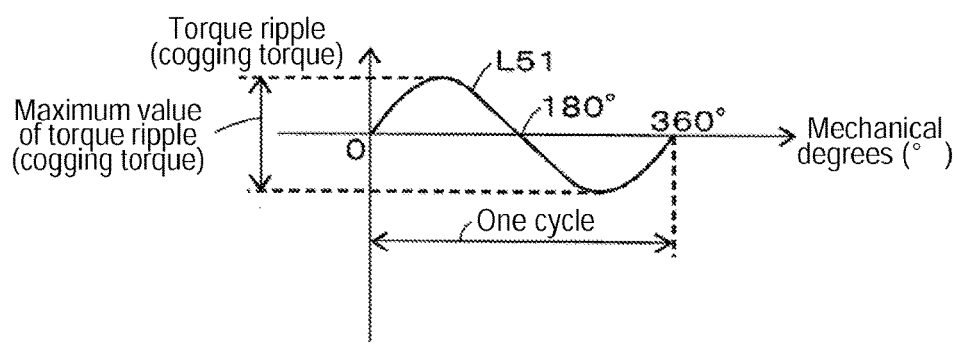
FIG. 13A is a schematic view illustrating an example of a waveform of a torque ripple (cogging torque) generated by the base portion according to a second embodiment disclosed here.
Figure 13B:
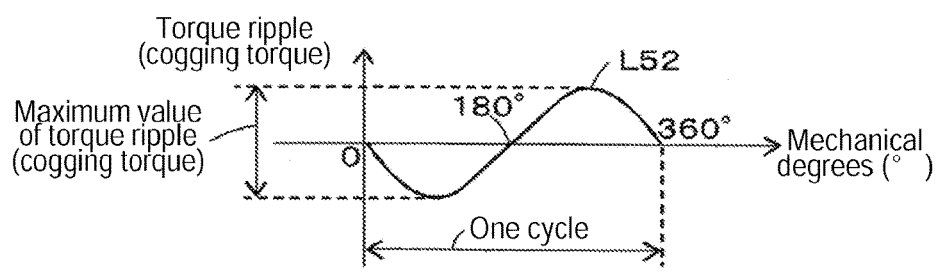
FIG. 13B is a schematic view illustrating an example of a waveform of a torque ripple (cogging torque) generated by the position portion according to the second embodiment disclosed here.

A curved line L51 in FIG. 13A indicates an example of a waveform of a torque ripple (cogging torque) generated between the rotor poles 32a, 32b provided at the base portion 41 and the stator poles. A curved line L52 in FIG. 13B indicates an example of a waveform of a torque ripple (cogging torque) generated between the rotor poles 32a, 32b provided at the position portion 42 and the stator poles in a case where the skew amount of the position portion 42 relative to the base portion 41 is ¼ pitch. A horizontal axis indicates mechanical degrees and a vertical axis indicates the magnitude of the torque ripple (cogging torque) in FIGS. 13A and 13B. In FIGS. 13A and 13B, a difference between a local maximum value and a local minimum value of the torque ripple (cogging torque) is indicated by a maximum value of the torque ripple (cogging torque).

The torque ripple of the rotary electric machine 10 is a pulsation generated in output torque of the rotary electric machine 10. The torque ripple is generated due to unevenness of the stator poles or the rotor poles 32a, 32b, eccentricity of the rotor 30, or magnetic discontinuity generated at a clearance of an opening portion of the slot, for example. The torque ripple includes, for example, cogging torque, slot ripple and pole ripple. The cogging torque is generated on a basis of a component of the magnetic attraction force between the stator poles and the rotor poles in the circumferential direction in a state where an electric power is not supplied. As mentioned above, in the rotary electric machine 10 in which the stator 20 includes the fractional slot configuration, the pole facing states which are different from each other are repeated alternately in the circumferential direction. Thus, the cogging torque tends to decrease as compared to a rotary electric machine where the stator 20 includes the integral slot configuration. Because the torque ripple tends to increase and decrease in association with increase and decrease of the cogging torque, the second embodiment aims to further decrease the torque ripple by further decreasing the cogging torque.

A cycle of the cogging torque depends on the number of stator poles (the number of slots) and the number of poles of the rotor 30. Specifically, because the rotary electric machine 10 of the second embodiment is the 8-pole 60-slot rotary electric machine, one cycle of the cogging torque is 3° which is obtained by dividing 360° (mechanical degrees) by 120 serving as a least common multiple of the number of stator poles (i.e., 60) and the number of rotor poles (i.e., 8). 3 mechanical degrees corresponding to one cycle of the cogging torque corresponds to ½ pitch.

In the rotary electric machine 10 of the second embodiment, the skew amount of the position portion 42 relative to the base portion 41 is specified to be ¼ pitch. The ¼ pitch of the stator pole corresponds to a half cycle of the cogging torque. Accordingly, the cogging torque generated between the rotor poles 32a, 32b provided at the base portion 41 and the stator poles (i.e., the cogging torque indicated by the curved line L51 in FIG. 13A) and the cogging torque generated between the rotor poles 32a, 32b provided at the position portion 42 and the stator poles (i.e., the cogging torque indicated by the curved line L52 in FIG. 13B) overlap to be cancelled out, thereby reducing the cogging torque.

Hear, the average skew amount of the position portion 42 relative to the base portion 41 for reducing the torque ripple of the rotary electric machine 10 is a second average skew amount Sav2. At this time, in the same way as the first embodiment, the lamination thickness t10 of the base portion 41 and the lamination thickness t11 of the position portion 42 are equal to each other. The second average skew amount Sav2 is calculated in a state where the skew amount of the base portion 41 is specified to be zero and the skew amount 0 of the base portion 41 is included for the calculation. The second average skew amount Sav2 is the average skew amount in the stator pole pitch.

According to the rotary electric machine 10 of the second embodiment, the skew amount of the position portion 42 relative to the base portion 41 is specified to be ¼ pitch. Thus, the second average skew amount Sav2 is ⅛ pitch (=(0+¼)/2). In addition, the skew amounts of the base portion 41 and the position portion 42 in a state where the skew amount of the base portion 41 is zero is represented as 0, ¼ in the stator pole pitch when being indicated in order from one of the portions at the end in the axial direction, i.e., in the present embodiment, from the base portion 41.

According to the rotary electric machine 10 of the second embodiment, the torque ripple (cogging torque) generated between the rotor poles 32a, 32b provided at the base portion 41 and the stator poles and the torque ripple (cogging torque) generated between the rotor poles 32a, 32b provided at the position portion 42 and the stator poles overlap to be cancelled out so that the torque ripple (cogging torque) is reduced. In addition, the rotary electric machine 10 of the second embodiment may decrease the torque ripple (cogging torque) by including minimum kinds (two kinds) of terms (i.e., 0 and ¼) in the skew amount and the minimum skew amount. Consequently, the rotary electric machine 10 of the second embodiment may minimize and restrain the decrease in the output torque which is caused by including a so-called skew configuration.

A third embodiment differs from the first embodiment in the number of the position portions 42 and the skew amount of each of the position portions 42 relative to the base portion 41. The difference of the third embodiment from the first embodiment is mainly explained below.

Figure 14:
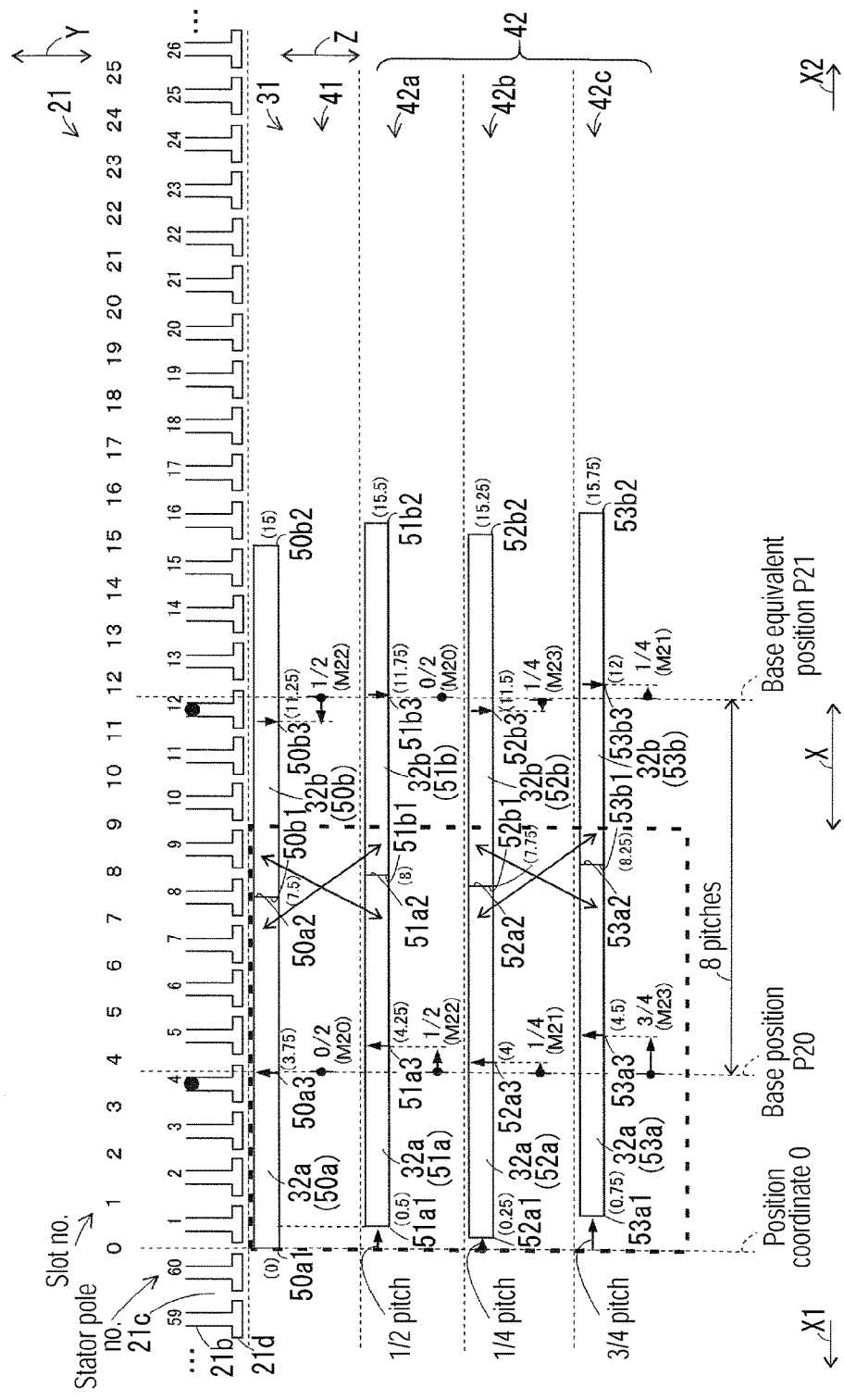
FIG. 14 is a schematic view illustrating the pole facing state between the rotor poles and the stator poles according to a third embodiment disclosed here.

The stator core 21 or the rotor core 31 (in the present embodiment, the rotor core 31) includes the base portion 41 and the plural (in the embodiment, three) position portions 42. In FIG. 14, the plural (three) position portions 42 are illustrated as a first position portion 42a, a second position portion 42b and a third position portion 42c. FIG. 14 corresponds to FIG. 4 illustrating the first embodiment. FIG.

14 is illustrated in the similar manner to FIG. 4 and a duplicate explanation is thus omitted.

The base portion 41 in the third embodiment includes substantially the same configuration as the base portion 41 in the first embodiment. The pair of the rotor poles 32a and 32b provided at the base portion 41 is the base rotor poles 50a and 50b. The first position portion 42a includes substantially the same configuration as the position portion 42 in the first embodiment. The pair of the rotor poles 32a and 32b provided at the first position portion 42a is the first rotor poles 51a and 51b. The skew amount of the first position portion 42a relative to the base portion 41 is specified to be ½ pitch. Thus, according to the rotary electric machine 10 of the third embodiment, in the same way as the first embodiment, at least one of the noise and vibration generated at the driving of the rotary electric machine 10 may be reduced.

The pair of the rotor poles 32a and 32b provided at the second position portion 42b is second rotor poles 52a and 52b. The skew amount of the second position portion 42b relative to the base portion 41 is specified to be ¼ pitch. As mentioned above in the second embodiment, the ¼ pitch corresponds to a half cycle of the cogging torque. Accordingly, the torque ripple (cogging torque) generated between the stator poles and the base rotor poles 50a, 50b provided at the base portion 41 and the torque ripple (cogging torque) generated between the stator poles and the second rotor poles 52a, 52b provided at the second position portion 42b overlap to be cancelled out to thereby decrease the torque ripple (cogging torque).

The pair of the rotor poles 32a and 32b provided at the third position portion 42c is third rotor poles 53a and 53b. The skew amount of the third position portion 42c relative to the base portion 41 is specified to be ¾ pitch. The skew amount between the first position portion 42a and the third position portion 42c is ¼ pitch which corresponds to a half cycle of the cogging torque. Accordingly, the torque ripple (cogging torque) generated between the stator poles and the first rotor poles 51a, 51b provided at the first position portion 42a and the torque ripple (cogging torque) generated between the stator poles and the third rotor poles 53a, 53b provided at the third position portion 42c overlap to be cancelled out to thereby reduce the torque ripple (cogging torque).

According to the rotary electric machine 10 of the third embodiment, the stator core 21 or the rotor core 31 (in the present embodiment, the rotor core 31) includes the base portion 41 and the plural (in the embodiment, three) position portions 42. The skew amount of each of the plural position portions 42 (specifically, the first position portion 42a, the second position portion 42b and the third position portion 42c) relative to the base portion 41 is specified in the aforementioned manner. Thus, the rotary electric machine 10 of the present embodiment may reduce at least one of the noise and vibration that occurs at the time of driving of the rotary electric machine 10 and may also reduce the torque ripple (cogging torque) of the rotary electric machine 10.

An average skew amount of the plural position portions 42 (first to third position portions 42a, 42b and 42c) relative to the base portion 41 for decreasing at least one of the noise and vibration that occurs at the time of driving of the rotary electric machine 10 and for decreasing the torque ripple of the rotary electric machine 10 is a third average skew amount Sav3. At this time, in the same way as the first embodiment, the lamination thickness t10 and the lamination thickness t11 are substantially equal to each other. In the third embodiment, the plural (three) position portions 42 (first to third position portions 42a, 42b and 42c) are provided. Thus, the lamination thicknesses of the first position portion 42a, the second position portion 42b and the third position portion 42c are equal to one another. The third average skew amount Sav3 is calculated in a state where the skew amount of the base portion 41 is specified to be zero and the skew amount 0 of the base portion 41 is included for the calculation. The third average skew amount Sav3 is the average skew amount in the stator pole pitch.

In the rotary electric machine 10 of the third embodiment, the skew amount of the first position portion 42a relative to the base portion 41 is specified to be ½ pitch. The skew amount of the second position portion 42b relative to the base portion 41 is specified to be ¼ pitch. The skew amount of the third position portion 42c relative to the base portion 41 is specified to be ¾ pitch. Thus, the third average skew amount Sav3 is ⅜ pitch (=(0+½+¼+¾)/4).

The skew amounts of the base portion 41 and the plural position portions 42 (first to third position portions 42a, 42b and 42c) in a state where the skew amount of the base portion 41 is zero is represented as 0, ¼, ½, and ¾ as being indicated in an ascending order. The aforementioned skew amounts are represented as a combination of a first group of skew amounts and a second group of skew amounts. The first group of skew amounts is represented as 0 and ½ when being indicated in the ascending order. The second group of skew amounts is obtained by adding ¼ pitch to each of the skew amounts in the first group. That is, the second group of skew amounts is represented as ¼ and ¾ when being indicated in the ascending order.

Accordingly, the rotary electric machine 10 of the third embodiment may achieve the reduction of at least one of the noise and vibration generated at the driving of the rotary electric machine 10 and the reduction of the torque ripple (cogging torque). Specifically, according to the rotary electric machine 10 of the third embodiment, each of the skew amounts in the second group may be easily specified by adding the skew amount for reducing the torque ripple (cogging torque) of the rotary electric machine 10 (i.e., adding ¼ pitch in the present embodiment) to each of the skew amounts in the first group for reducing at least one of the noise and vibration generated at the driving of the rotary electric machine 10.

In the third embodiment, as indicated by a region surrounded with a broken line in FIG. 14, four kinds of pole facing states are obtained between the stator poles and the rotor poles 32a, 32b. In FIG. 14, the pole facing state of the base rotor pole 50a relative to the stator poles is indicated by a pole facing state M20. The pole facing state of the first rotor pole 51a relative to the stator poles is indicated by a pole facing state M22. The pole facing state of the second rotor pole 52a relative to the stator poles is indicated by a pole facing state M21. The pole facing state of the third rotor pole 53a relative to the stator poles is indicated by a pole facing state M23. The equivalent position at which the pole facing state between the stator poles and the rotor poles 32a, 32b is equivalent to the pole facing state at the base position P20 is indicated by a base equivalent position P21.

As illustrated in FIG. 14, the rotary electric machine 10 of the third embodiment includes four pole facing states which are different from one another (i.e., four kinds of pole facing states) for each of the magnetic poles of the rotor 30, i.e., for the rotor poles 32a (specifically, rotor poles 50a, 51a, 52a and 53a) adjacent to one another in the axial direction and for the rotor poles 32b (specifically, rotor poles 50b, 51b, 52b and 53b) adjacent to one another in the axial direction. Thus, the attraction distributions of the rotor poles 32a (rotor poles 50a, 51a, 52a and 53a) disposed in the axial direction overlap to be mixed and averaged. In the same manner, the attraction distributions of the rotor poles 32b (rotor poles 50b, 51b, 52b and 53b) disposed in the axial direction overlap to be mixed and averaged. As a result, at least one of the noise and vibration generated at the driving of the rotary electric machine 10 may be reduced. In addition, as mentioned above, the rotary electric machine 10 of the third embodiment includes the pair of rotor poles (i.e., the base rotor pole 50a and the second rotor pole 52a, and also the first rotor pole 51a and the third rotor pole 53a) that cancels out the torque ripple (cogging torque) to thereby reduce the torque ripple (cogging torque).

The pole facing state of the second rotor pole 52b is equivalent to the pole facing state M23 of the third rotor pole 53a. Specifically, the second rotor pole 52b includes first and second end portions 52b1 and 52b2 in the circumferential direction. The position coordinate of the first end portion 52b1 is 7.75. The third rotor pole 53a includes first and second end portions 53a1 and 53a2 in the circumferential direction. The position coordinate of the first end portion 53a1 is 0.75. That is, a value after decimal point of the position coordinate of the first end portion 52b1 and a value after decimal point of the position coordinate of the first end portion 53a1 are the same as each other. In addition, the position coordinate of the second end portion 52b2 of the second rotor pole 52b is 15.25 and the position coordinate of the second end portion 53a2 of the third rotor pole 53a is 8.25. That is, a value after decimal point of the position coordinate of the second end portion 52b2 and a value after decimal point of the position coordinate of the second end portion 53a2 are the same as each other. Accordingly, the pole facing state of the second rotor pole 52b is equivalent to the pole facing state M23 of the third rotor pole 53a.

A fourth embodiment differs from the third embodiment in the skew amount of a part of the plural (three) position portions 42 (first to third position portions 42a, 42b and 42c). The difference of the fourth embodiment from the third embodiment is mainly explained below.

Figure 15:
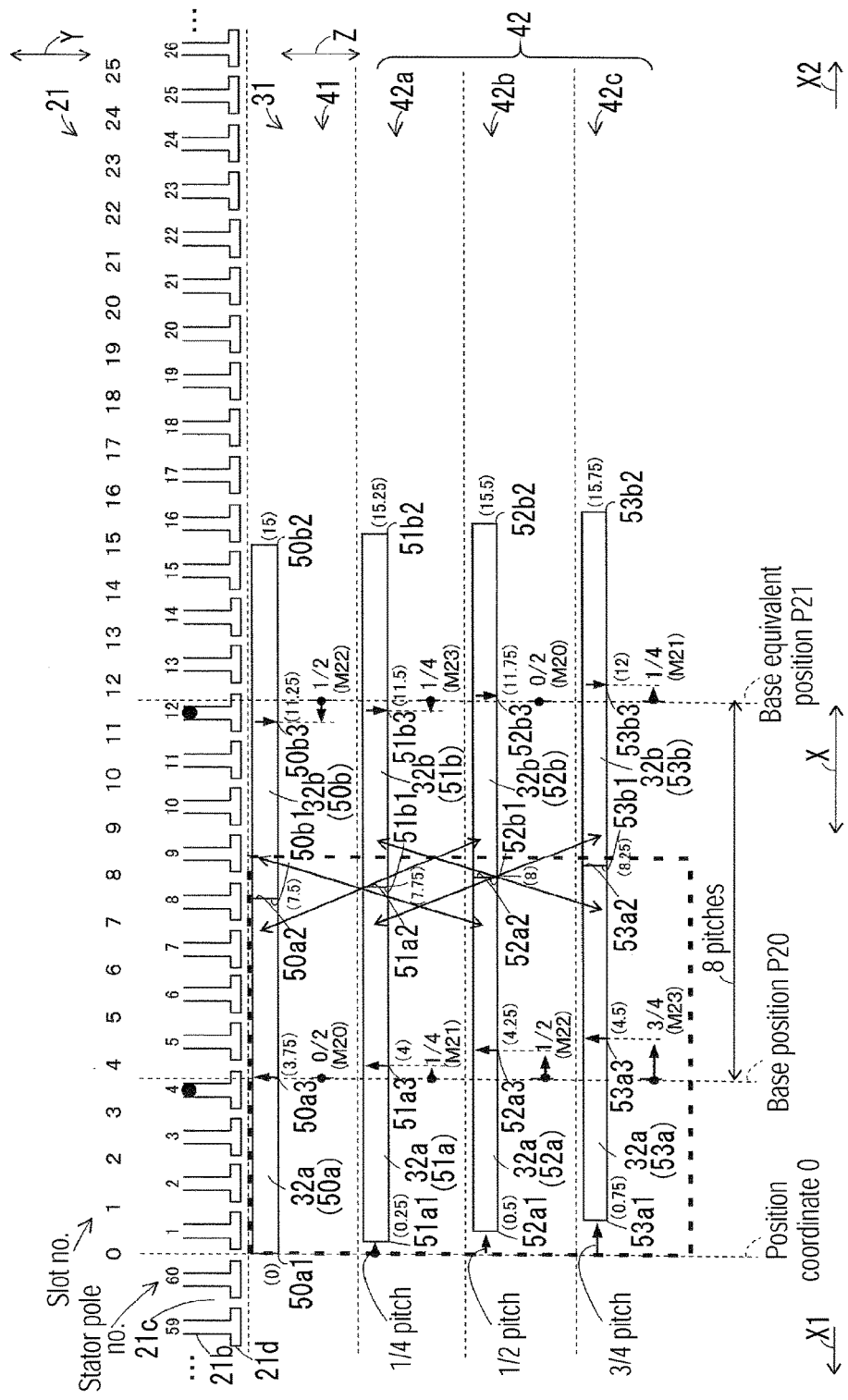
FIG. 15 is a schematic view illustrating the pole facing state between the rotor poles and the stator poles according to a fourth embodiment disclosed here.

In the third embodiment as illustrated in FIG. 14, the skew amount of the first position portion 42a relative to the base portion 41 is specified to be ½ pitch. The skew amount of the second position portion 42b relative to the base portion 41 is specified to be ¼ pitch. On the other hand, in the fourth embodiment as illustrated in FIG. 15, the skew amount of the first position portion 42a relative to the base portion 41 is specified to be ¼ pitch. The skew amount of the second position portion 42b relative to the base portion 41 is specified to be ½ pitch. The skew amount of the third position portion 42c relative to the base portion 41 is specified to be ¾ pitch in both the third and fourth embodiments. FIG. 15 corresponds to FIG. 4 illustrating the first embodiment and to FIG. 14 illustrating the third embodiment. FIG. 15 is illustrated in the similar manner to FIGS. 4 and 14 and thus a duplicate explanation is omitted.

The skew amount of the first position portion 42a relative to the base portion 41 in the fourth embodiment matches the skew amount of the second position portion 42b relative to the base portion 41 in the third embodiment. The skew amount of the second position portion 42b relative to the base portion 41 in the fourth embodiment matches the skew amount of the first position portion 42a relative to the base portion 41 in the third embodiment. Thus, the rotary electric machine 10 of the fourth embodiment includes the four pole facing states which are different from one another (i.e., four kinds of pole facing states) as mentioned in the third embodiment, for each of the magnetic poles of the rotor 30, i.e., for the rotor poles 32a (specifically, rotor poles 50a, 51a, 52a and 53a) adjacent to one another in the axial direction and for the rotor poles 32b (specifically, rotor poles 50b, 51b, 52b and 53b) adjacent to one another in the axial direction. In addition, the rotary electric machine 10 of the fourth embodiment includes the pair of rotor poles (i.e., the base rotor pole 50a and the first rotor pole 51a, and also the second rotor pole 52a and the third rotor pole 53a) that cancels out the torque ripple (cogging torque). Therefore, the rotary electric machine 10 of the fourth embodiment may obtain the same effect as the third embodiment.

Next, a sum of adjacent skew amounts (which is hereinafter simply referred to as an adjacent skew sum) Sad is considered as below. The adjacent skew sum Sad is a sum of the skew amounts between the adjacent portions, i.e., the plural position portions 42 (the first position portion 42a, the second position portion 42b and the third position portion 42c) and the base portion 41. At this time, however, because the adjacent skew sum Sad increases with increase of the number of the position portions 42 (in the present embodiment, three), the number of the position portions 42 is fixed. For example, in the third embodiment, the skew amount between the base portion 41 and the first position portion 42a adjacent to the base portion 41 is ½ pitch. The skew amount between the first position portion 42a and the second position portion 42b adjacent to the first position portion 42a is ¼ pitch. The skew amount between the second position portion 42b and the third position portion 42c adjacent to the second position portion 42b is ½ pitch. Accordingly, the adjacent skew sum Sad of the third embodiment is 5/4 pitch (=½+¼+½).

In the fourth embodiment, the skew amount between the base portion 41 and the first position portion 42a adjacent to the base portion 41 is ¼ pitch. The skew amount between the first position portion 42a and the second position portion 42b adjacent to the first position portion 42a is ¼ pitch. The skew amount between the second position portion 42b and the third position portion 42c adjacent to the second position portion 42b is ¼ pitch. Thus, the adjacent skew sum Sad in the fourth embodiment is ¾ pitch (=¼+¼+¼). Such the adjacent skew sum Sad (i.e., ¾ pitch) is a minimum value under the condition where the number of the position portions 42 is the same (for example, three).

Accordingly, in the rotary electric machine 10 of the fourth embodiment, the sum of the skew amounts between the adjacent portions including the base portion 41 is minimal under the condition with the same number of the position portions 42. Therefore, the rotary electric machine 10 of the fourth embodiment may restrain and minimize the decrease of the output torque which is caused by including the skew configuration. The skew amounts of the base portion 41 and the position portions 42 (first to third position portions 42a, 42b and 42c) in a state where the skew amount of the base portion 41 is specified to be zero is represented as 0, ¼, ½, and ¾ when being indicated in order from one of the portions at the end in the axial direction, i.e., in the present embodiment, from the base portion 41.

On the other hand, a case where the adjacent skew sum Sad becomes maximal when the number of the position portions 42 is three is considered as below. For example, according to a first modified example, the skew amounts of the base portion 41 and the position portions 42 (first to third position portions 42a, 42b and 42c) in a state where the skew amount of the base portion 41 is specified to be zero is represented as ¼, ¾, 0, and ½ when being indicated in order from one of the portions at the end in the axial direction. The adjacent skew sum Sad is 7/4 pitch (=½+¾+½). Such the adjacent skew sum Sad (i.e., 7/4 pitch) is a maximum value under the condition where the number of the position portions 42 is the same (for example, three).

According to the rotary electric machine 10 of the first modified example, the number of terms included in the skew amounts of the adjacent portions (the base portion 41 and three position portions 42) suitable for decreasing at least one of the noise and vibration (in this case, the term "½" as in the ½ series rotary electric machine 10) is two. Such number is maximum under the condition where the number of the position portions 42 is the same (for example, three). This is also applied to the rotary electric machine 10 of the third embodiment. Consequently, the rotary electric machine 10 of the first modified example and the rotary electric machine 10 of the third embodiment may maximize a reduction effect of at least one of the noise and vibration generated at the driving of the rotary electric machine 10.

Characteristics of the ½ series rotary electric machine 10 (8-pole 60-slot rotary electric machine) are explained with reference to FIGS. 16A, 16B, 16C and 16D. A horizontal axis in each of FIGS. 16A, 16B, 16C and 16D indicates an average skew amount (mechanical degrees). A vertical axis in each of FIGS. 16A, 16B, 16C and 16D indicates a ratio relative to each value which is specified to be 100% in a state where the average skew amount is zero. A curved line L61 in FIG. 16A indicates characteristics of an outer circumferential deformation amount by a target resonance order of the stator core 21. The target resonance order is a resonance order which causes a problem in at least one of the noise and vibration generated at the driving of the rotary electric machine 10. The reduction effect of at least one of the noise and vibration generated at the driving of the rotary electric machine 10 increases with decrease of the outer circumferential deformation amount of the stator core 21. A curved line L62 in FIG. 16B indicates characteristics of maximum values of the torque ripple when the rotary electric machine 10 is supplied with power. A curved line L63 in FIG. 16C indicates characteristics of the cogging torque of the rotary electric machine 10. A curved line L64 in FIG. 16D indicates characteristics of maximum values of the output torque of the rotary electric machine 10. The aforementioned characteristics are obtained by changing the average skew amount in the rotary electric machine 10 according to the first embodiment including the base portion 41 and the single position portion 42 at the rotor core 31.

Figure 16A:
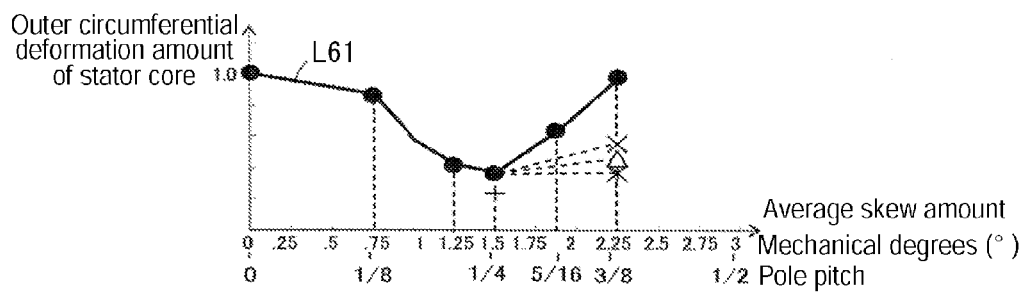
FIG. 16A is a diagram illustrating an example of a relation between an outer circumferential deformation amount and an average skew amount of the stator core of the rotary electric machine saving as a ½ series rotary electric machine.

As indicated by the curved line L61 in FIG. 16A, the outer circumferential deformation amount of the stator core 21 decreases with increase of the average skew amount, which leads to the decrease of at least one of the noise and vibration generated at the driving of the rotary electric machine 10. In a case where the average skew amount is ¼ pitch (i.e., 1.5 mechanical degrees), the outer circumferential deformation amount of the stator core 21 is minimized and at least one of the noise and vibration generated at the driving of the rotary electric machine 10 is maximally reduced. The aforementioned average skew amount matches the first average skew amount Sav1 in the first embodiment. In a case where the average skew amount is greater than ¼ pitch (i.e., greater than 1.5 mechanical degrees), the outer circumferential deformation amount of the stator core 21 turns to increase and the reduction effect of at least one of the noise and vibration generated at the driving of the rotary electric machine 10 decreases.

Figure 16B:
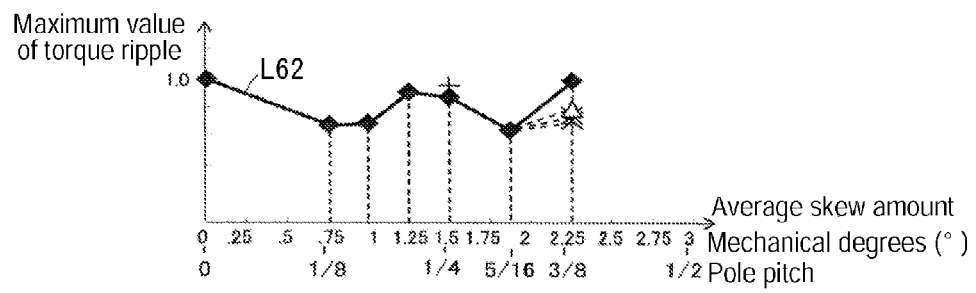
FIG. 16B is a diagram illustrating an example of a relation between a maximum value of the torque ripple and the average skew amount of the ½ series rotary electric machine.

As illustrated by the curved line L62 in FIG. 16B, the maxim value of the torque ripple of the rotary electric machine 10 decreases with increase of the average skew amount. In a case where the average skew amount is in the vicinity of ⅛ pitch (i.e., 0.75 mechanical degrees), a first local minimum value is obtained. The aforementioned average skew amount matches the second average skew amount Sav2 in the second embodiment. In a case where the average skew amount is substantially greater than ⅛ pitch (i.e., greater than 0.75 mechanical degrees), the maximum value of the torque ripple of the rotary electric machine 10 turns to increase and then decreases again. In a case where the average skew amount is 5/16 pitch (i.e., 1.875 mechanical degrees), the maximum value of the torque ripple of the rotary electric machine 10 achieves a second local minimum value. In a case where the average skew amount is greater than 5/16 pitch (1.875 mechanical degrees), the maximum value of the torque ripple of the rotary electric machine 10 again increases.

Figure 16C:
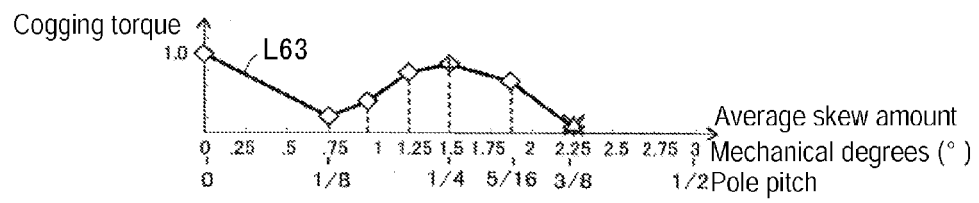
FIG. 16C is a diagram illustrating an example of a relation between the cogging torque and the average skew amount of the ½ series rotary electric machine.

As indicated by the curved line L63 in FIG. 16C, the cogging torque of the rotary electric machine 10 includes the characteristics substantially the same as the characteristics indicated by the curved line L62 in FIG. 16B. At this time, however, the cogging torque of the rotary electric machine 10 achieves a second minimum value when the average skew amount is ⅜ pitch (i.e., 2.25 mechanical degrees).

Figure 16D:
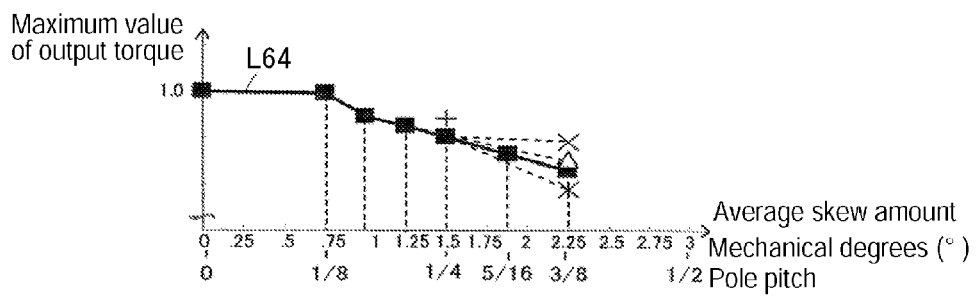
FIG. 16D is a diagram illustrating an example of a relation between a maximum value of an output torque and the average skew amount of the ½ series rotary electric machine.

As illustrated by the curved line L64 in FIG. 16D, the maximum value of the output torque of the rotary electric machine 10 is substantially constant up to ⅛ pitch (i.e., 0.75 mechanical degrees) of the average skew amount. In a case where the average skew amount is greater than ⅛ pitch (greater than 0.75 mechanical degrees), the maximum value of the output torque of the rotary electric machine 10 decreases gradually.

Asterisks in FIGS. 16A, 16B, 16C and 16D indicate characteristics of the rotary electric machine 10 according to the third embodiment. Crosses in FIGS. 16A, 16B, 16C and 16D indicate characteristics of the rotary electric machine 10 according to the fourth embodiment. Triangles in FIGS. 16A, 16B, 16C and 16D indicate characteristics of the rotary electric machine 10 according to a second modified example. Pluses in FIGS. 16A, 16B, 16C and 16D indicate characteristics of the rotary electric machine 10 according to a third modified example.

According to the rotary electric machine 10 of the second modified example, the skew amounts of the base portion 41 and the three position portions 42 (i.e., the first position portion 42a, the second position portion 42b and the third position portion 42c) in a state where the skew amount of the base portion 41 is specified to be zero are represented as ¼, 0, ½, and ¾ when being indicated in order from one of the portions at the end in the axial direction. In the rotary electric machine 10 of the second modified example, the lamination thickness t10 of the base portion 41 and the lamination thickness t11 of each of the three position portions 42 are the same as each other.

The rotary electric machine 10 of the third modified example includes the single position portion 42, which is the same as the first embodiment, however, the lamination thickness t10 of the base portion 41 and the lamination thickness t11 of the position portion 42 are different from each other. Thus, the skew amount of the position portion 42 relative to the base portion 41 differs from the first embodiment. Specifically, in a state where the lamination thickness t10 of the base portion 41 is specified to be 1, the lamination thickness t11 of the position portion 42 is specified to be 1.5. The skew amount of the position portion 42 relative to the base portion 41 is specified to be 5/12 pitch.

As illustrated in FIG. 16A, even in a case where the average skew amount is greater than ¼ pitch (1.5 mechanical degrees), the outer circumferential deformation amount of the stator core 21 in the rotary electric machine 10 of the third embodiment, which is indicated with the asterisk, is inhibited from increasing. The reduction effect of at least one of the noise and vibration generated at the driving of the rotary electric machine 10 is therefore maintained. The outer circumferential deformation amount of the stator core 21 in the rotary electric machine 10 of the second modified example indicated with the triangle slightly increases as compared to the rotary electric machine 10 of the third embodiment. The reduction effect of at least one of the noise and vibration generated at the driving of the rotary electric machine 10 thus slightly decreases. The outer circumferential deformation amount of the stator core 21 in the rotary electric machine 10 of the fourth embodiment indicated with the cross slightly increases as compared to the rotary electric machine 10 of the second modified example. The aforementioned reduction effect thus further decreases. That is, the rotary electric machine 10 of the third embodiment includes the highest reduction effect of at least one of the noise and vibration generated at the driving of the rotary electric machine 10 among the fourth embodiment, the second modified example and the third modified example. This is because, in the rotary electric machine 10 of the third embodiment, the number of terms included in the skew amounts of the adjacent portions (the base portion 41 and three position portions 42) suitable for decreasing at least one of the noise and vibration (in this case, the term "½" (3 mechanical degrees) as in the ½ series rotary electric machine 10) is two which is maximum among the fourth embodiment, the second modified example and the third modified example.

As illustrated in FIG. 16B, in a case where the average skew amount is greater than $5/16$ pitch (1.875 mechanical degrees), the maximum value of the torque ripple slightly increases according to the rotary electric machine 10 of the third embodiment indicated with the asterisk, however, the reduction effect of the torque ripple is maintained. Such condition is also applied to the rotary electric machine 10 of the second modified example indicated with the triangle and to the rotary electric machine 10 of the fourth embodiment indicated with the cross.

As illustrated in FIG. 16C, the cogging torque is minimized according to the rotary electric machine 10 of the third embodiment indicated with the asterisk in a case where the average skew amount is $3/8$ pitch (2.25 mechanical degrees). The aforementioned average skew amount matches the third average skew amount Sav3 in the third embodiment. Such condition is also applied to the rotary electric machine 10 of the second modified example indicated with the triangle and to the rotary electric machine 10 of the fourth embodiment indicated with the cross.

As illustrated in FIG. 16D, the maximum value of the output torque according to the rotary electric machine 10 of the third embodiment indicated with the asterisk decreases and becomes lower than the rotary electric machine 10 of the first embodiment indicated with the curved line L64 in a case where the average skew amount is $3/8$ pitch (2.25 mechanical degrees). On the other hand, the maximum value of the output torque of the rotary electric machine 10 of the second modified example indicated with the triangle is substantially equal to the rotary electric machine 10 of the first embodiment indicated with the curved line L64 in a case where the average skew amount is $3/8$ pitch (2.25 mechanical degrees). Further, the maximum value of the output torque of the rotary electric machine 10 of the fourth embodiment indicated with the cross is restrained from decreasing as compared to the rotary electric machine 10 of the first embodiment indicated with the curved line L64 in a case where the average skew amount is $3/8$ pitch (2.25 mechanical degrees). This is because the adjacent skew sum Sad is minimized according to the rotary electric machine 10 of the fourth embodiment among the aforementioned fourth embodiment, the second modified example and the third modified example.

In FIGS. 16A, 16B, 16C and 16D, the lamination thickness t10 and the lamination thickness t11 may differ from each other as in the rotary electric machine 10 of the third modified example indicated with the plus. Here, the skew amount of one portion i out of the base portion 41 and the single position portion 42 or the plural position portions 42 is a skew amount Si and the lamination thickness of the portion i is a lamination thickness ti. At this time, the average skew amount is obtained by dividing a total value which is obtained by adding a multiple of the skew amount Si and the lamination thickness ti to any portions by a sum of the lamination thicknesses, i.e., a following value is obtained: $(\Sigma_i(Si \cdot ti))/(\Sigma_i ti)$. For example, in the rotary electric machine 10 of the first embodiment, in a case where the lamination thickness t10 of the base portion 41 is 1, the lamination thickness t11 of the position portion 42 is 1, the skew amount of the base portion 41 is 0°, and the skew amount of the position portion 42 relative to the base portion 41 is 3°, the average skew amount is 1.5° $(=\{0+(1\times3)\}/(1+1))$. The aforementioned degrees are all mechanical degrees.

On the other hand, in the rotary electric machine 10 of the third modified example indicated with the plus in FIGS. 16A, 16B, 16C and 16D, the lamination thickness t10 of the base portion 41 is 1, and the lamination thickness t11 of the position portion 42 is 1.5, for example. In addition, the skew amount of the base portion 41 is 0°, and the skew amount of the position portion 42 relative to the base portion 41 is 2.5°, for example. At this time, the average skew amount is 1.5° $(=\{0+(1.5\times2.5)\}/(1+1.5))$ which is equal to the average skew amount of the rotary electric machine 10 of the first embodiment. As a result, the rotary electric machine 10 of the third modified example indicated with the plus may obtain the characteristics substantially equal to the rotary electric machine 10 of the first embodiment. Such condition is also applied to embodiments explained later and to the rotary electric machine 10 serving as a 1/c series rotary electric machine.

Accordingly, in a case where the lamination thickness t10 of the base portion 41 and the lamination thickness t11 of the position portion 42 differ from each other, the skew amount of the position portion 42 relative to the base portion 41 differs from the skew amount obtained in a case where the lamination thickness t10 of the base portion 41 and the lamination thickness t11 of the position portion 42 are the same as each other. Thus, in the disclosure, the average skew amount (i.e., the first average skew amount Sav1, the second average skew amount Sav2 and the third average skew amount Sav3) is specified in a state where the lamination thicknesses of the base portion 41 and the single or plural position portions(s) 42 are equal to one another in the axial direction (third direction, arrow Z direction). In other words, in a case where the lamination thickness t10 and the lamination thickness t11 are different from each other, the skew amount of the position portion 42 relative to the base portion 41 may be specified on a basis of the aforementioned relation to calculate the average skew amount (i.e., the first average skew amount Sav1, the second average skew amount Sav2, and the third average skew amount Sav3).

A fifth embodiment differs from the first embodiment in the number of slots per pole per phase. The difference of the fifth embodiment from the first embodiment is mainly explained below.

Figure 17:
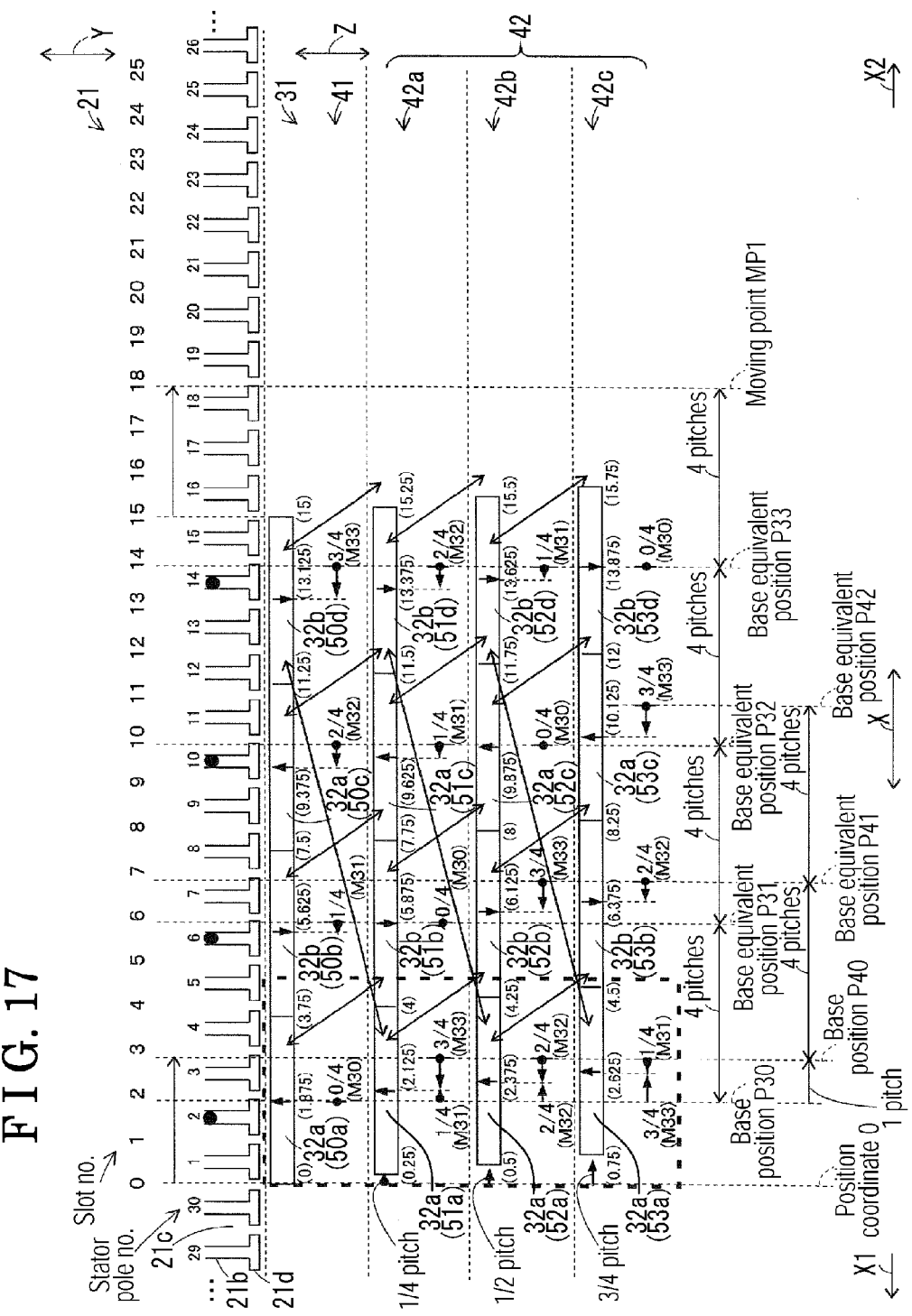
FIG. 17 is a schematic view illustrating the pole facing state between the rotor poles and the stator poles according to a fifth embodiment disclosed here.

As illustrated in FIG. 17, the rotary electric machine 10 of the fifth embodiment serves as an 8-pole 30-slot rotary electric machine. The number of slots per pole per phase is 1.25. That is, the rotary electric machine 10 of the fifth embodiment is a ¼ series rotary electric machine. FIG. 17 corresponds to FIG. 4 illustrating the first embodiment. FIG. 17 is illustrated in the similar manner to FIG. 4 and thus a duplicate explanation is omitted. In the fifth embodiment, the number of slots per pole is 3.75. In FIG. 17, the base equivalent interval of the stator 20 is specified to be the nearest integer number obtained by the round-off (i.e., by counting fractions over ½ as one and disregarding the rest) of the number of slots per pole (in the present embodiment, 3.75) in the stator pole pitch. In the present embodiment, the base equivalent interval is therefore four (four pitches). FIG. 17 illustrates the pole facing state between the stator poles and the rotor poles 32a, 32b in a state where the base equivalent interval is four in the stator pole pitch. In FIG. 17, each filled circle attached to each of the teeth portions 21b designated by the stator pole numbers 2, 6, 10 and 14 indicates the pole center position of the stator poles within the base equivalent interval.

In FIG. 17, equivalent positions at each of which the pole facing state between each of the stator poles and the rotor pole (rotor pole 32a, 32b) is equivalent to a base position P30 are indicated by base equivalent positions P31, P32 and P33. The base equivalent positions P31, P32 and P33 are obtained at positions away from the base position P30 by the integral multiple of the nearest integer number (i.e., integral multiple of 4 in this case) obtained by the round-off of the number of slots per pole. In addition, equivalent positions at each of which the pole facing state between each of the stator poles and the rotor pole (rotor pole 32a, 32b) is equivalent to a base position P40 are indicated by base equivalent positions P41 and P42. The base equivalent positions P41 and P42 are obtained at positions away from the base position P40 by the integral multiple of the nearest integer number (i.e., integral multiple of four in this case) obtained by the round-off of the number of slots per pole.

Here, a relation between the base position P30 and the base position P40 is explained. The rotary electric machine 10 of the fifth embodiment is the ¼ series rotary electric machine 10. Thus, one cycle of the pole facing state is based on two pairs of magnetic poles of the rotor 30 (i.e., two pairs of rotor poles (four poles) in the circumferential direction). A point that is moved from the base position P30 by the two pairs of rotor poles (four poles) to the right side in FIG. 17 in the first direction (arrow X2 direction) is specified to be a moving point MP1. As illustrated in FIG. 17, the moving point MP1 exists at the stator pole number 18. The base position P40 is obtained by moving the base equivalent position (moving point MP1) that is present at the stator pole number 18 to an equivalent position in the vicinity of the stator pole number 2. Specifically, the base position P40 is positioned at a point moved from (i.e., away from) the base position P30 by one pitch of the stator pole to the right side in FIG. 17 in the first direction (arrow X2 direction). The aforementioned one pitch is obtained by subtracting 15 pitches serving as the number of stator poles facing the two pairs of magnetic poles (four magnetic poles) of the rotor 30, i.e., the two pairs of the rotor poles 32a, 32b in the circumferential direction, from 16 pitches which is obtained by multiplying the base equivalent interval (in the present embodiment, 4 pitches) by four (corresponding to the four magnetic poles).

As illustrated in FIG. 17, two pairs of the rotor poles 32a and 32b (four rotor poles) provided at the base portion 41 and adjacent to one another in the circumferential direction are base rotor poles 50a, 50b, 50c and 50d. The ¼ series rotary electric machine 10 includes four kinds of pole facing states (pole facing states M30, M31, M32 and M33) and includes four kinds of attraction distributions. Thus, the attraction distributions of the two pairs of the rotor poles 32a and 32b, i.e., of the base rotor poles 50a, 50b, 50c and 50d, are different from one another. As a result, the attraction distribution is inhibited from being equivalent with respect to the single rotor pole and is equivalent with respect to every two pairs of rotor poles (every four rotor poles).

The aforementioned state is also applied to the other rotor poles 32a and 32b which are not illustrated in FIG. 17. In the ¼ series rotary electric machine 10, two pairs of the rotor poles 32a and 32b, i.e., two rotor poles 32a and two rotor poles 32b including the different attraction distributions from one another, are disposed adjacent to one another in the circumferential direction and serve as a unit. The ¼ series rotary electric machine 10 achieves a multipolar (in the present embodiment, 8-pole) rotary electric machine based on a parallel displacement of two pairs of the rotor poles 32a and 32b adjacent to each other in the first direction and including the different attraction distributions from each other.

In the ¼ series rotary electric machine 10, the static displacement amount of the stator core 21 includes four kinds of the peak values including the different magnitudes from one another. Thus, the ¼ series rotary electric machine 10 includes the component of the vibratory force of a second order rotation. The vibratory force of the $2^{nd}$ order rotation is repeated with the two pairs of magnetic poles of the rotor (i.e., four magnetic poles). The static displacement amount of the stator core 21 includes the two peak values in one round in the circumferential direction.

In the rotary electric machine 10 in which the stator 20 includes the integral slot configuration, the component of the vibratory force of a smaller order (in the embodiment, the $2^{nd}$ order rotation) than the component of the vibratory force of the order which relies on the number of poles of the rotor 30 (in the embodiment, 8 poles) (i.e., the $8^{th}$ order rotation in the present embodiment) is obtained. Accordingly, in the rotary electric machine 10 including a wide range of drive rotation numbers, the number of rotations that matches a natural frequency of vibration of the stator core 21 is likely to be generated within the range of drive rotation numbers. As a result, a resonance of the stator 20 occurs, which may increase the noise and vibration generated upon driving of the rotary electric machine 10.

According to the rotary electric machine 10 of the fifth embodiment, the stator core 21 or the rotor core 31 (in the embodiment, the rotor core 31) includes the base portion 41 and the plural (in the embodiment, three) position portions 42. In FIG. 17, the three position portions 42 are indicated by the first position portion 42a, the second position portion 42b and the third position portion 42c.

The first position portion 42a is substantially the same as the position portion 42 in the first embodiment. Two pairs of the rotor poles 32a and 32b provided at the first position portion 42a are the first rotor poles 51a, 51b, 51c and 51d. The skew amount of the first position portion 42a relative to the base portion 41 is specified to be ¼ pitch. Two pairs of the rotor poles 32a and 32b provided at the second position portion 42b are the second rotor poles 52a, 52b, 52c and 52d. The skew amount of the second position portion 42b relative to the base portion 41 is specified to be ½ pitch. Two pairs of the rotor poles 32a and 32b provided at the third position portion 42c are the third rotor poles 53a, 53b, 53c and 53d. The skew amount of the third position portion 42c relative to the base portion 41 is specified to be ¾ pitch.

For example, in a region surrounded with a broken line in FIG. 17, overlapping of the attraction distribution of the base rotor pole 50a and the attraction distribution of the second rotor pole 52a causes an increase of the component of the vibratory force of the $4^{th}$ order rotation. In the same way, overlapping of the attraction distribution of the first rotor pole 51a and the attraction distribution of the third rotor pole 53a causes an increase of the component of the vibratory force of the $4^{th}$ order rotation. Further overlapping of the aforementioned resulting two attraction distributions causes an increase of the component of the vibratory force of the $8^{th}$ order rotation. The aforementioned condition is also applied to the base rotor pole 50b adjacent to the base rotor pole 50a, to the base rotor pole 50c adjacent to the base rotor pole 50b and to the base rotor pole 50d adjacent to the base rotor pole 50c.

According to the rotary electric machine 10 of the fifth embodiment, in the same way as the first embodiment, the magnetic attraction distributions of the rotor poles 32a (specifically, rotor poles 50a, 51a, 52a and 53a) adjacent in the axial direction are mixed and averaged in the radial direction (second direction, arrow Y direction). Such condition is also applied to the rotor poles 32b (specifically, rotor poles 50b, 51b, 52b and 53b). As a result, the attraction distribution of the rotor poles 32a adjacent in the axial direction and the attraction distribution of the rotor poles 32b adjacent in the axial direction are substantially equivalent to each other or approach a substantially equivalent state. Thus, in the rotary electric machine 10 of the present embodiment, the component of the vibratory force of a smaller order (in the present embodiment, the $2^{nd}$ order rotation) than the component of the vibratory force of the order which relies on the number of poles of the rotor 30 (in the embodiment, 8 poles) (i.e., the $8^{th}$ order rotation in the present embodiment) is reduced and the component of the vibratory force of the order which relies on the number of poles of the rotor 30 may increase. Accordingly, in the rotary electric machine 10 of the fifth embodiment, a high order rotation (in the present embodiment, the $8^{th}$ order rotation) substantially the same level as a case where a stator is formed in the integral slot configuration is obtained in the distribution of the attraction force. The number of rotations that matches the natural frequency of vibration of the stator core 21 increases so as to fall out of the range of drive rotation numbers of the rotary electric machine 10. That is, according to the rotary electric machine 10 of the fifth embodiment, the opportunity of resonance of the stator 20 is avoidable to decrease at least one of the noise and vibration that is generated upon driving of the rotary electric machine 10.

In the rotary electric machine 10 of the fifth embodiment, the first average skew amount Sav1 is ⅜ pitch (=(0+¼+½+¾)/4). The skew amounts of the base portion 41 and the plural (in the embodiment, three) position portions 42 (the first position portion 42a, the second position portion 42b and the third position portion 42c) in a case where the skew amount of the base portion 41 is specified to be zero are represented in arithmetic progression as 0, ¼, ½, ¾ when being indicated in order from one of the portions at the end in the axial direction, i.e., in the present embodiment, from the base portion 41. In addition, the skew amount between the base portion 41 and the first position portion 42a adjacent to the base portion is ¼ pitch. The skew amount of the first position portion 42a and the second position portion 42b adjacent to the first position portion 42a is ¼ pitch. The skew amount of the second position portion 42b and the third position portion 42c adjacent to the second position portion 42b is ¼ pitch. Thus, the adjacent skew sum Sad is ¾ pitch (=¼+¼+¼).

According to the rotary electric machine 10 of the fifth embodiment, the sum of skew amounts between the adjacent portions including the base portion 41 (adjacent skew sum Sad) is minimized under the conditions that the number of the position portions 42 is the same (in the present embodiment, three position portions 42). Thus, the rotary electric machine 10 of the present embodiment may minimize and restrain the decrease of the output torque caused by the skew configuration.

The rotary electric machine 10 of the fifth embodiment may also reduce the torque ripple (cogging torque) in the same way as the second embodiment. In the 8-pole 30-slot rotary electric machine 10 of the fifth embodiment, one cycle of the cogging torque is 3° (mechanical degrees) which is obtained by dividing 360° (mechanical degree) by 120 serving as a least common multiple of the number of stator poles (i.e., 30) and the number of rotor poles (i.e., 8). 3 mechanical degrees corresponding to one cycle of the cogging torque corresponds to ¼ pitch.

Thus, in order to reduce the torque ripple (cogging torque), the rotor core 31 includes the single position portion 42, and the skew amount thereof relative to the base portion 41 may be specified to be ⅛ pitch corresponding to a half cycle of the cogging torque. In this case, the skew amounts of the base portion 41 and the position portion 42 in a state where the skew amount of the base portion 41 is specified to be zero is represented as 0, ⅛. In addition, the second average skew amount Sav2 is 1/16 pitch (=(0+⅛)/2).

Further, the rotary electric machine 10 of the fifth embodiment may also reduce at least one of the noise and vibration generated at the driving of the rotary electric machine 10 and the torque ripple (cogging torque) in the same way as the third embodiment. In this case, the position portion 42 includes a fourth position portion, a fifth position portion, a sixth position portion and a seventh position portion in addition to the first position portion 42a, the second position portion 42b and the third position portion 42c. The skew amount of the fourth position portion relative to the base portion 41 is specified to be ⅛ pitch. The skew amount of the fifth position portion relative to the base portion 41 is specified to be ⅜ pitch. The skew amount of the sixth position portion relative to the base portion 41 is specified to be ⅝ pitch. The skew amount of the seventh position portion relative to the base portion 41 is specified to be ⅞ pitch. Thus, the third average skew amount Sav3 is 7/16 (=(0+¼+½+¾+⅛+⅜+⅝+⅞)/8) pitch.

The skew amounts of the base portion 41 and the plural (in this case, seven) position portions 42 (first to seventh position portions) may be desirably 0, ⅛, ¼, ⅜, ½, ⅝, ¾, ⅞ in the arithmetic progression when being indicated in order from one of the portions at the end in the axial direction, i.e., in the present embodiment, from the base portion 41. In addition, the aforementioned skew amounts may be desirably represented as a skew amount by a combination of a first group of skew amounts and a second group of skew amounts. The first group of skew amounts is represented as 0, ¼, ½, and ¾ in the arithmetic progression when being indicated in the ascending order. The second group of skew amounts is obtained by adding ⅛ pitch to each of the skew amounts in the first group. That is, the second group of skew amounts is represented as ⅛, ⅜, ⅝, and ⅞ in the arithmetic progression when being indicated in the ascending order.

In this case, the adjacent skew sum Sad is ⅞ (=⅛+⅛+⅛+⅛+⅛+⅛+⅛) pitch. The sum of skew amounts between the adjacent portions including the base portion 41 (adjacent skew sum Sad) is minimized under the conditions that the number of the position portions 42 is the same (in this case, seven position portions 42). Thus, the rotary electric machine 10 of the present embodiment may minimize and restrain the decrease of the output torque caused by the skew configuration.

In addition, the skew amounts of the base portion 41 and the plural (in this case, seven) position portions 42 (first to seventh position portions) in a state where the skew amount of the base portion 41 is specified to be zero may be also represented as 0, ¼, ½, ¾, ⅛, ⅜, ⅝, ⅞ when being indicated in order from one of the portions at the end in the axial direction, i.e., in the present embodiment, from the base portion 41. At this time, a frequency that the skew amount suitable for decreasing at least one of the noise and vibration, i.e., ¼ pitch as in the ¼ series rotary electric machine 10, is specified for the skew amount between the adjacent portions (the base portion 41 and three position portions 42) is greater than the aforementioned case (represented as 0, ⅛, ¼, ⅜, ½, ⅝, ¾, and ⅞). Specifically, the skew amounts of the adjacent portions including the base portion 41 include two groups of skew amounts. One of the groups of skew amounts is represented as 0, ¼, ½, and ¾ so that the ¼ pitch is specified for three consecutive skew amounts between the adjacent portions. The other of the groups of skew amounts is represented as ⅛, ⅜, ⅝, and ⅞ so that the ¼ pitch is specified for three consecutive skew amounts between the adjacent portions. Thus, the rotary electric machine 10 at this time improves the reduction efficiency of at least one of the noise and vibration that occurs at the driving of the rotary electric machine 10 as compared to the aforementioned case (represented as 0, ⅛, ¼, ⅜, ½, ⅝, ¾, and ⅞). On the other hand, the adjacent skew sum Sad is 17/8 pitch (=¼+¼+¼+⅝+¼+¼+¼) which is greater than the adjacent skew sum Sad in the aforementioned case.

Characteristics of the ¼ series rotary electric machine 10 (8-pole 30-slot rotary electric machine) are explained with reference to FIGS. 18A, 18B, 18C and 18D. FIGS. 18A to 18D correspond to FIGS. 16A to 16D respectively illustrating the fourth embodiment. FIGS. 18A to 18D are illustrated in the same way as FIGS. 16A to 16D and thus a duplicate explanation is omitted. Curved lines L71, L72, L73 and L74 correspond to the curved lines L61, L62, L63 and L64 in FIGS. 16A to 16D respectively. The characteristics of the ¼ series rotary electric machine 10 indicated with the curved lines L71, L72, L73 and L74 are obtained with the changes of the average skew amount.

Figure 18A:
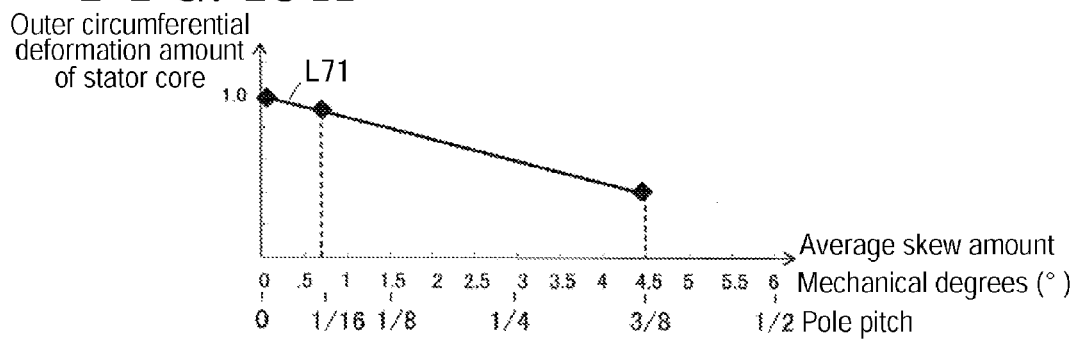
FIG. 18A is a diagram illustrating an example of a relation between the outer circumferential deformation amount and the average skew amount of the stator core of rotary electric machine serving as a ¼ series rotary electric machine.

As indicated by the curved line L71 illustrated in FIG. 18A, the outer circumferential deformation amount of the stator core 21 gradually decreases with increase of the average skew amount so that at least one of the noise and vibration that occurs at the driving of the rotary electric machine 10 is reduced. In FIG. 18A, in a case where the average skew amount is ⅜ pitch (i.e., 4.5 mechanical degrees), the outer circumferential deformation amount of the stator core 21 is minimum and therefore at least one of the noise and vibration that occurs at the driving of the rotary electric machine 10 is maximally reduced. The aforementioned average skew amount (⅜ pitch) matches the first average skew amount Sav1 according to the fifth embodiment. In addition, as indicated by the curved line L74 in FIG. 18D, the maximum value of the output torque of the rotary electric machine 10 includes the substantially same tendency as the outer circumferential deformation amount of the stator core 21. That is, the maximum value of the output torque gradually decreases with increase of the average skew amount.

Figure 18B:
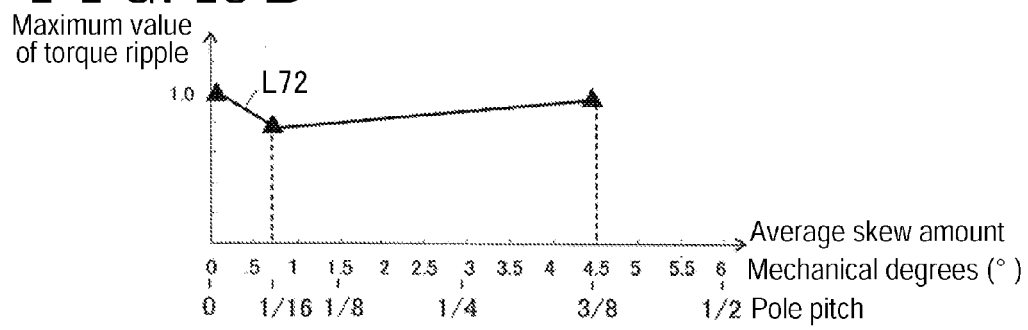
FIG. 18B is a diagram illustrating an example of a relation between the maximum value of the torque ripple and the average skew amount of the ¼ series rotary electric machine.
Figure 18C:
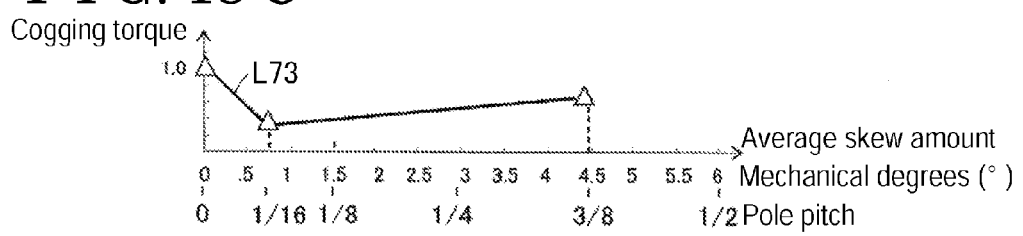
FIG. 18C is a diagram illustrating an example of a relation between the cogging torque and the average skew amount of the ¼ series rotary electric machine.
Figure 18D:
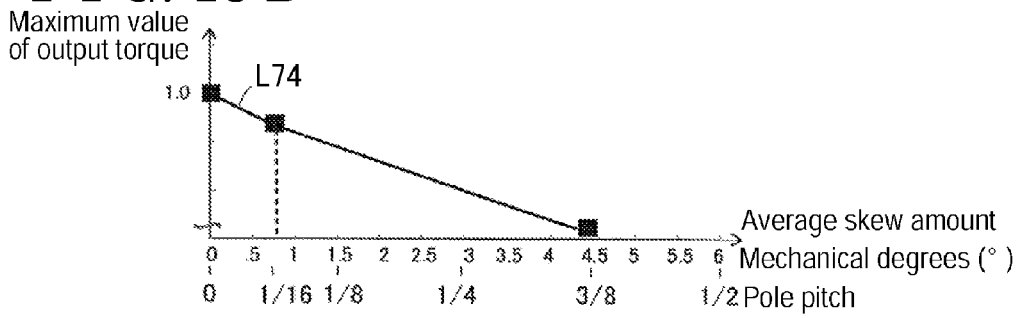
FIG. 18D is a diagram illustrating an example of a relation between the maximum value of the output torque and the average skew amount of the ¼ series rotary electric machine.

As indicated by the curved line L72 in FIG. 18B, the maximum value of the torque ripple decreases with increase of the average skew amount and becomes minimum when the average skew amount is 1/16 pitch (i.e., 0.75 mechanical degrees). The aforementioned average skew amount (1/16 pitch) matches the second average skew amount Sav2 according to the fifth embodiment. In a case where the average skew amount is greater than 1/16 pitch, the maximum value of the torque ripple turns to increase. As indicated by the curved line L73 in FIG. 18C, the cogging torque includes substantially the same tendency as the torque ripple. That is, in a case where the average skew amount is 1/16 pitch (0.75 mechanical degrees), the cogging torque becomes minimum.

In a case where the number of the position portions 42 in an appropriate positional relationship increases, the average skew amount increases so that at least one of the noise and vibration that occurs at the time of driving of the rotary electric machine 10 increases. On the other hand, in a case where the number of the position portions 42 increases, magnetic flux leakage or short-circuit may easily occur. Specifically, in the rotary electric machine 10 including the permanent magnets at the rotor core 31, leakage or short-circuit may easily occur in flux generated by the permanent magnets. As a result, effective flux decreases so that the output torque of the rotary electric machine 10 is likely to decrease. In a case where the number of the position portions 42 increases, the number of components such as the permanent magnets, for example, increases so that a manufacturing cost may increase. Therefore, in view of restraining the decrease of the output torque of the rotary electric machine 10 and a manufacturing cost, the rotary electric machine 10 where the number of the position portions 42 is less is desirable.

In a case where the adjacent skew sum Sad is minimized under the same conditions that the number of the plural position portions 42 is the same (in this case, three), the decrease of the output torque of the rotary electric machine 10 is minimized. In a case where the adjacent skew sum Sad is appropriately specified, the reduction effect of at least one of the noise and vibration generated at the driving of the rotary electric machine 10 improves. Accordingly, because the effects that are obtained differ from one another depending on the amount of the adjacent skew sum Sad, arrangements of the base portion 41 and the position portions 42 may be appropriately chosen on a basis of a request specification of the rotary electric machine 10.

The number of the position portions 42 may be reduced. As mentioned above, the increase of the number of the position portions 42 may cause the decrease of the output torque of the rotary electric machine 10. Thus, the number of the position portions 42 is reduced so as to restrain the decrease of the output torque of the rotary electric machine 10 while maintaining the reduction effect of at least one of the noise and vibration that occurs at the time of driving of the rotary electric machine 10. For example, in the ¼ series rotary electric machine 10 according to the fifth embodiment, the skew amounts of the base portions 41 and the three position portions 42 (first to third position portions 42a, 42b and 42c) in a state where the skew amount of the base portion 41 is zero are represented as 0, ¼, ½, and ¾ in the arithmetic progression when being indicated in the ascending order. In a case where the number of the position portions 42 is reduced, alternate skew amounts may be combined. Specifically, the skew amounts of the base portion 41 and the single position portion 42 may be represented as 0, ½. The skew amounts of the base portion 41 and the single position portion 42 may be also represented as ¼, ¾.

The number of the position portions 42 may be reduced so that the same first average skew amount Sav1 is obtained. As mentioned in the fifth embodiment, the first average skew amount Sav1 is ⅜ pitch. Thus, the skew amounts of the base portion 41 and the single position portion 42 may be represented as 0 and ¾ pitch, for example. In addition, the number of the position portions 42 may be reduced so that the decrease of the output torque of the rotary electric machine 10 is minimized. In this case, the skew amounts of the base portion 41 and the single position portion 42 may be represented as 0 and ¼ pitch, for example.

A sixth embodiment differs from the aforementioned fifth embodiment in the number of slots per pole per phase. The difference of the sixth embodiment from the fifth embodiment is mainly explained below.

Figure 19:
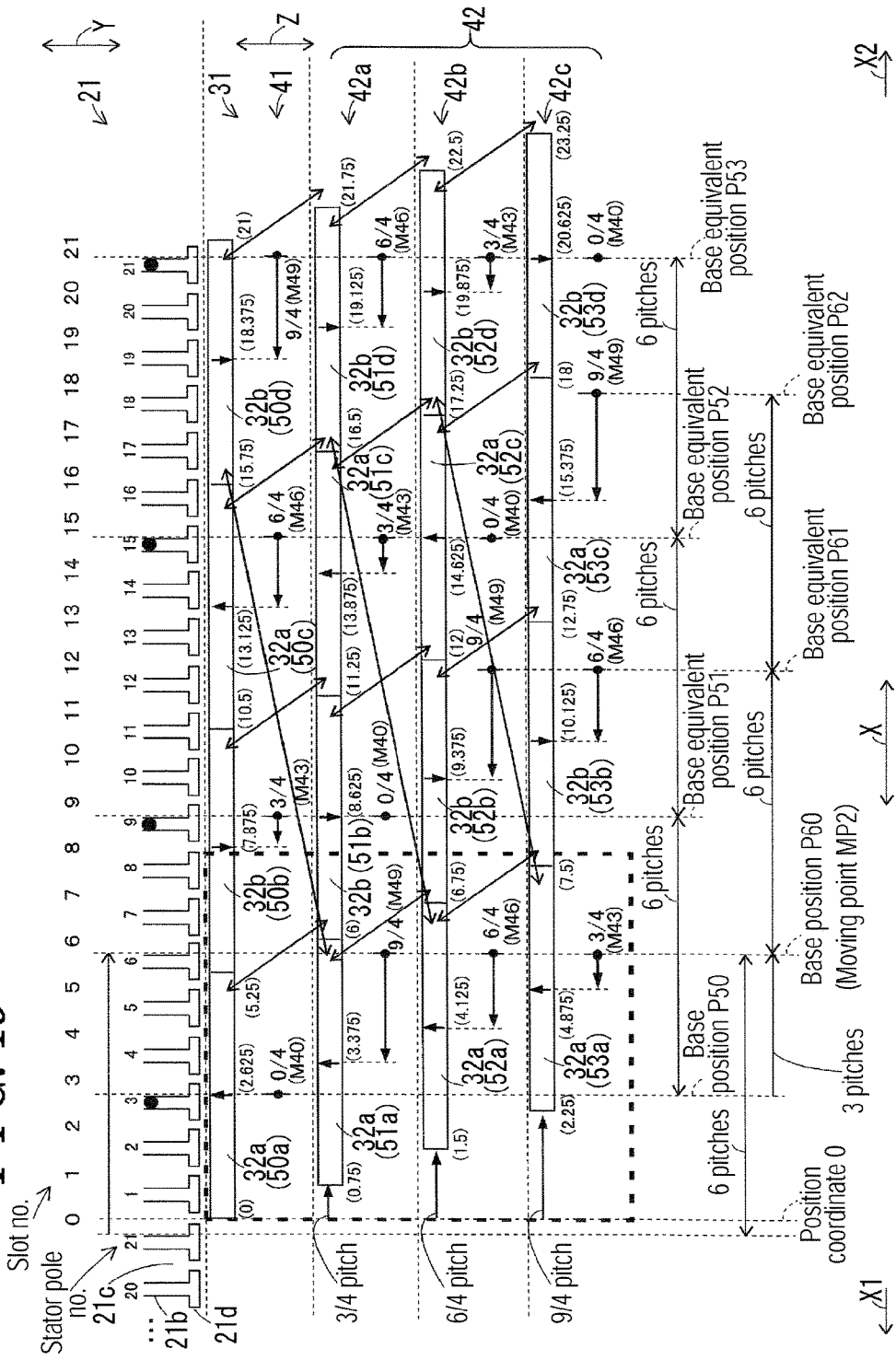
FIG. 19 is a schematic view illustrating the pole facing state between the rotor poles and the stator poles according to a sixth embodiment disclosed here.

As illustrated in FIG. 19, the rotary electric machine 10 of the sixth embodiment is a 4-pole 21-slot rotary electric machine. The number of slots per pole per phase is 1.75. That is, the rotary electric machine 10 of the sixth embodiment is a ¾ series rotary electric machine. FIG. 19 corresponds to FIG. 4 illustrating the first embodiment and FIG. 17 illustrating the fifth embodiment. FIG. 19 is illustrated in the same way as FIGS. 4 and 17 and thus a duplicate explanation is omitted. The number of slots per pole is 5.25 in the sixth embodiment. In FIG. 19, the base equivalent interval of the stator 20 is specified to be the nearest integer number obtained by a round-up of the number of slots per pole in the stator pole pitch (in the present embodiment, 5.25). In the sixth embodiment, the base equivalent interval is therefore six (six pitches). FIG. 19 illustrates the pole facing state between the rotor poles 32a, 32b and the stator poles in a case where the base equivalent interval is six pitches.

In FIG. 19, each filled circle attached to each of the teeth portions 21b designated by the stator pole numbers 3, 9, 15 and 21 indicates the pole center position of the stator poles in the base equivalent interval. In FIG. 19, equivalent positions at which the pole facing state between the stator pole and the rotor pole 32a or 32b is equivalent to the pole facing state at a base position P50 is indicated by base equivalent positions P51, P52 and P53. The base equivalent positions P51, P52 and P53 are obtained at positions away from the base position P50 by the integral multiple of the nearest integer number obtained by the round-up of the number of slots per pole (i.e., integral multiple of six, in this case). In addition, equivalent positions at which the pole facing state between the stator pole and the rotor pole 32a or 32b is equivalent to the pole facing state at a base position P60 is indicated by base equivalent positions P61 and P62. The base equivalent positions P61 and P62 are obtained at positions away from the base position P60 by the integral multiple of the nearest integer number obtained by the round-up of the number of slots per pole (i.e., integral multiple of six, in this case).

The relation between the base position P50 and the base position P60 is the same as the relation between the base position P30 and the base position P40 in the fifth embodiment. A moving point MP2 corresponds to the moving point MP1 in the fifth embodiment. As illustrated in FIG. 19, the moving point MP2 is present at the stator pole number 6. The base position P60 is positioned at a point moved from (i.e., away from) the base portion P50 by 3 pitches to the right side in FIG. 19 in the first direction (arrow X2 direction). The aforementioned 3 pitches is obtained by subtracting 21 pitches serving as the number of stator poles facing two pairs of magnetic poles (four magnetic poles) of the rotor 30 (i.e., the two pairs of the rotor poles 32a and 32b in the circumferential direction) from 24 pitches which is obtained by multiplying the base equivalent interval (in the present embodiment, 6 pitches) by four (corresponding to the four magnetic poles).

In the same way as the fifth embodiment, the stator core 21 or the rotor core 31 (in the present embodiment, the rotor core 31) includes the base portion 41 and the plural (in the present embodiment, three) position portions 42. The three position portions 42 correspond to the first position portion 42a, the second position portion 42b and the third position portion 42c.

The two pairs of the rotor poles 32a, 32b (four rotor poles) provided at the first position portion 42a are the first rotor poles 51a, 51b, 51c and 51d. The skew amount of the first position portion 42a relative to the base portion 41 is specified to be ¾ pitch. The two pairs of the rotor poles 32a, 32b (four rotor poles) provided at the second position portion 42b are the second rotor poles 52a, 52b, 52c and 52d. The skew amount of the second position portion 42b relative to the base portion 41 is specified to be 6/4 pitch. The two pairs of the rotor poles 32a, 32b (four rotor poles) provided at the third position portion 42c are the third rotor poles 53a, 53b, 53c and 53d. The skew amount of the third position portion 42c relative to the base portion 41 is specified to be 9/4 pitch. As illustrated by a region surrounded with a broken line in FIG. 19, four kinds of pole facing states are also provided in the sixth embodiment as indicated by pole facing states M40, M43, M46 and M49.

As illustrated in FIG. 19, the rotary electric machine 10 of the sixth embodiment includes four pole facing states which are different from one another (i.e., four kinds of pole facing states) for each of the magnetic poles of the rotor 30, i.e., for the rotor poles 32a (specifically, rotor poles 50a, 51a, 52a and 53a) adjacent to one another in the axial direction and for the rotor poles 32b (specifically, rotor poles 50b, 51b, 52b and 53b) adjacent to one another in the axial direction. Thus, the attraction distributions of the rotor poles 32a (rotor poles 50a, 51 a, 52a and 53a) disposed in the axial direction overlap to be mixed and averaged. In the same manner, the attraction distributions of the rotor poles 32b (rotor poles 50b, 51b, 52b and 53b) disposed in the axial direction overlap to be mixed and averaged. As a result, at least one of the noise and vibration generated at the driving of the rotary electric machine 10 may be reduced. In addition, in the rotary electric machine 10 of the sixth embodiment, the first average skew amount Sav1 is 9/8 pitch (=(0+¾+3/2+9/4)/4). Further, the skew amounts of the base portion 41 and the three position portions 42 in a state where the base portion 41 is specified to be zero is 0, ¾, ½, 9/4 in the ascending order. Thus, the rotary electric machine 10 of the sixth embodiment may obtain the same effect as the fifth embodiment.

A seventh embodiment differs from the sixth embodiment in the base equivalent interval. The difference of the seventh embodiment from the sixth embodiment is mainly explained below.

Figure 20:
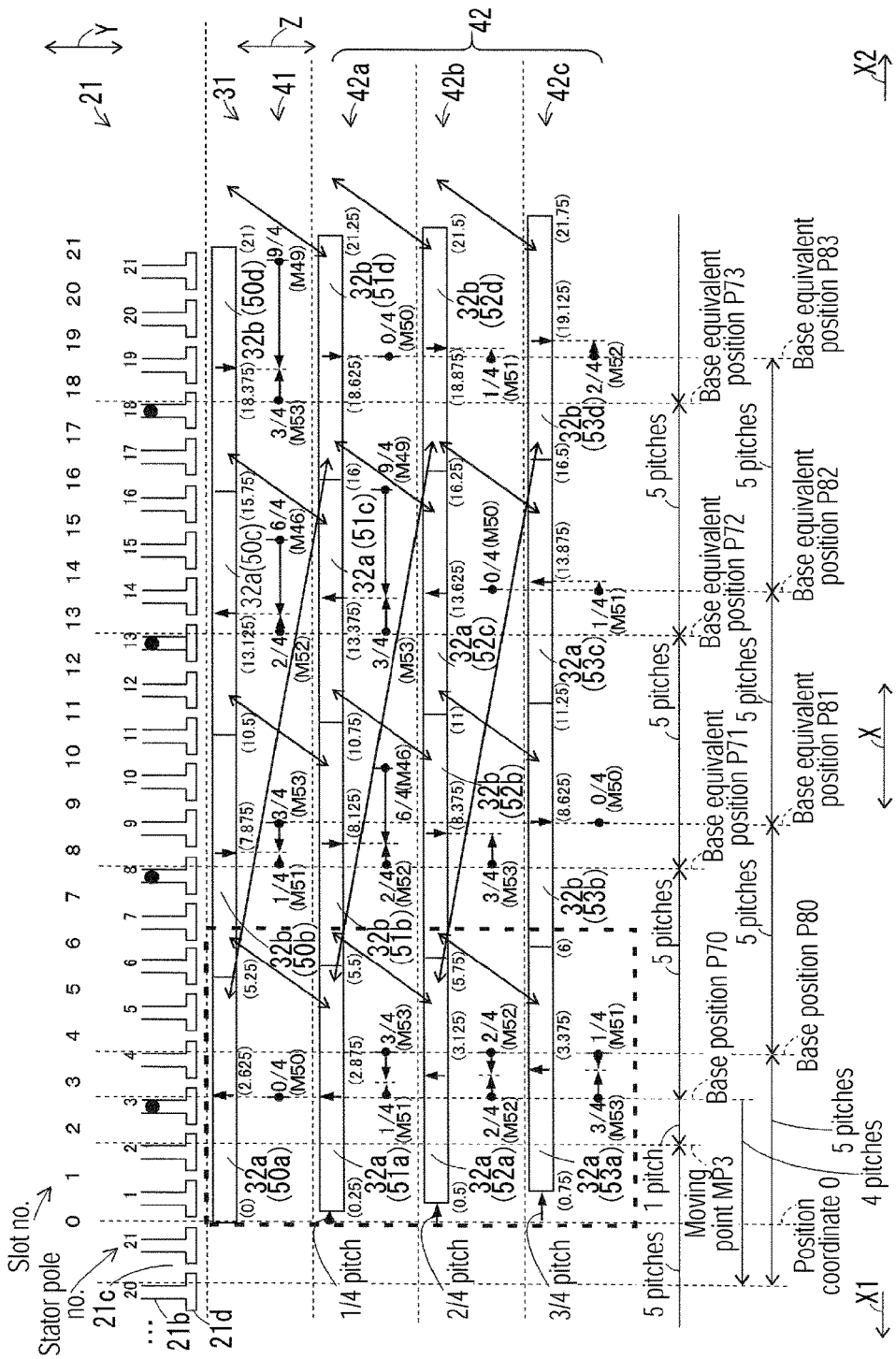
FIG. 20 is a schematic view illustrating the pole facing state between the rotor poles and the stator poles according to a seventh embodiment disclosed here.

As illustrated in FIG. 20, the rotary electric machine 10 of the seventh embodiment is a 4-pole 21-slot rotary electric machine. The number of slots per pole is 5.25. In FIG. 20, the base equivalent interval of the stator 20 is specified to be the nearest integer number obtained by the round-off (i.e., by counting fractions over ½ as one and disregarding the rest) of the number of slots per pole in the stator pole pitch (i.e., 5.25). In the seventh embodiment, the base equivalent interval is therefore five (five pitches). FIG. 20 illustrates the pole facing state between the rotor poles 32a, 32b and the stator poles in a state where the base equivalent interval is five pitches. In FIG. 20, each filled circle attached to each of the teeth portions 21b designated by the stator pole numbers 3, 8, 13 and 18 indicates the pole center position of the stator poles within the base equivalent interval. FIG. 20 corresponds to FIG. 4 illustrating the first embodiment, FIG. 17 illustrating the fifth embodiment, and FIG. 19 illustrating the sixth embodiment. FIG. 20 is illustrated in the same way as FIGS. 4, 17 and 19 and thus a duplicate explanation is omitted.

In FIG. 20, equivalent positions at which the pole facing state between the stator pole and the rotor pole 32a or 32b is equivalent to the pole facing state at a base position P70 is indicated by base equivalent positions P71, P72 and P73. The base equivalent positions P71, P72 and P73 are obtained at positions away from the base position P70 by the integral multiple of the nearest integer number obtained by the round-off of the number of slots per pole (i.e., integral multiple of five, in this case). In addition, equivalent positions at which the pole facing state between the stator pole and the rotor pole 32a or 32b is equivalent to the pole facing state at a base position P80 is indicated by base equivalent positions P81, P82 and P83. The base equivalent positions P81, P82 and P83 are obtained at positions away from the base position P80 by the integral multiple of the nearest integer number obtained by the round-off of the number of slots per pole (i.e., integral multiple of five, in this case).

In the seventh embodiment, the number of slots per pole (i.e, 5.25) is rounded off (i.e., digits after the decimal point is rounded down) for specifying the base equivalent interval. Thus, the relation between the base position P70 and the base position P80 is different from the relation between the bas position P50 and the base position P60 in the sixth embodiment. A moving point MP3 corresponds to the moving point MP1 in the fifth embodiment and to the moving point MP2 in the sixth embodiment. As illustrated in FIG. 20, the moving point MP3 exists at the stator pole number 2. The moving point MP3 is obtained at a point away from the base position P70 to the left side in FIG. 20 in the first direction (arrow X1 direction) by 1 pitch. That is, the moving point MP3 is obtained at a point moved to the right side in FIG. 20 in the first direction (arrow X2 direction) by −1 (minus one) pitch. Such moving amount (−1 pitch) is obtained by subtracting 21 pitches serving as the number of stator poles facing the two pairs of magnetic poles (four magnetic poles) of the rotor 30 (i.e., the two pairs of the rotor poles 32a and 32b in the circumferential direction) from 20 pitches which is obtained by multiplying the base equivalent interval (in the present embodiment, 5 pitches) by four (corresponding to the four magnetic poles). The aforementioned movement of the equivalent position is repeated fourth times so that the moving point MP3 moves from the base position P70 by 4 pitches to the left side in the first direction (arrow X1 direction) (i.e., by −4 pitches to the right side in the first direction) to be equivalent to the base position P80.

In the same way as the sixth embodiment, the stator core 21 or the rotor core 31 (in the present embodiment, the rotor core 31) includes the base portion 41 and the plural (in the present embodiment, three) position portions 42. The three position portions 42 are the first position portion 42a, the second position portion 42b and the third position portion 42c.

The two pairs of the rotor poles 32a and 32b (four rotor poles) provided at the first position portion 42a are the first rotor poles 51a, 51b, 51c and 51d. In the seventh embodiment, the skew amount of the first position portion 42a relative to the base portion 41 is specified to be ¼ pitch. The two pairs of the rotor poles 32a and 32b (four rotor poles) provided at the second position portion 42b are the second rotor poles 52a, 52b, 52c and 52d. In the seventh embodiment, the skew amount of the second position portion 42b relative to the base portion 41 is specified to be ½ pitch. The two pairs of the rotor poles 32a and 32b (four rotor poles) provided at the third position portion 42c are the third rotor poles 53a, 53b, 53c and 53d. In the seventh embodiment, the skew amount of the third position portion 42c relative to the base portion 41 is specified to be ¾ pitch. As illustrated in a region surrounded with a broken line in FIG. 20, four kinds of pole facing states are also provided in the seventh embodiment as indicated by pole facing states M50, M51, M52 and M53. In FIG. 20, the pole facing states M46 and M49 are also indicated.

As illustrated in FIG. 20, the rotary electric machine 10 of the seventh embodiment includes four pole facing states which are different from one another, i.e., four kinds of pole facing states, for each of the magnetic poles of the rotor 30, i.e., for the rotor poles 32a (specifically, rotor poles 50a, 51a, 52a and 53a) adjacent to one another in the axial direction and for the rotor poles 32b (specifically, rotor poles 50b, 51b, 52b and 53b) adjacent to one another in the axial direction. Thus, the attraction distributions of the rotor poles 32a (rotor poles 50a, 51 a, 52a and 53a) disposed in the axial direction overlap to be mixed and averaged. In the same manner, the attraction distributions of the rotor poles 32b (rotor poles 50b, 51b, 52b and 53b) disposed in the axial direction overlap to be mixed and averaged. As a result, at least one of the noise and vibration generated at the driving of the rotary electric machine 10 may be reduced. In addition, in the rotary electric machine 10 of the seventh embodiment, the first average skew amount Sav1 is ⅜ pitch (=(0+¼+½+¾)/4). Further, the skew amounts of the base portion 41 and the three position portions 42 in a state where the skew amount of the base portion 41 is specified to be zero is 0, ¼, ½, and ¾ in the ascending order. Thus, the rotary electric machine 10 of the seventh embodiment may obtain the same effect as the fifth embodiment.

In the seventh embodiment, the skew amount between the base portion 41 and the first position portion 42a adjacent to the base portion 41 is ¼ pitch. The skew amount between the first position portion 42a and the second position portion 42b adjacent to the first position portion 42a is ¼ pitch. The skew amount between the second position portion 42b and the third position portion 42c adjacent to the second position portion 42b is ¼ pitch. Thus, the adjacent skew sum Sad of the seventh embodiment is ¾ pitch (=¼+¼+¼).

On the other hand, according to the rotary electric machine 10 of the sixth embodiment, the skew amount between the base portion 41 and the first position portion 42a adjacent to the base portion 41 is ¾ pitch. The skew amount between the first position portion 42a and the second position portion 42b adjacent to the first position portion 42a is ¾ pitch. The skew amount between the second position portion 42b and the third position portion 42c adjacent to the second position portion 42b is ¾ pitch. Thus, the adjacent skew sum Sad of the sixth embodiment is 9/4 pitch (=¾+¾+¾).

Accordingly, in the rotary electric machine 10 of the seventh embodiment, the adjacent skew sum Sad is smaller than that of the rotary electric machine 10 of the sixth embodiment. Thus, the rotary electric machine 10 of the seventh embodiment may restrain the decrease of the output torque caused by the skew configuration as compared to the rotary electric machine 10 of the sixth embodiment and may minimize the decrease of the output torque.

As mentioned above, the skew amount of the position portion 42 relative to the base portion 41 in the ¾ series rotary electric machine 10 may be specified in the same way as the ¼ series rotary electric machine 10. In addition, the torque ripple (cogging torque) of the rotary electric machine 10 may be reduced according to the seventh embodiment and the sixth embodiment in the same way as the fifth embodiment. Further, at least one of the noise and vibration that occurs at the time of driving of the rotary electric machine 10 and the torque ripple (cogging torque) of the rotary electric machine 10 may be reduced according to the seventh embodiment and the sixth embodiment in the same way as the fifth embodiment.

In the first to fourth embodiments, the rotary electric machine 10 serves as the ½ series rotary electric machine. In the fifth embodiment, the rotary electric machine 10 serves as the ¼ series rotary electric machine. In the sixth and seventh embodiments, the rotary electric machine 10 serves as the ¾ series rotary electric machine. The rotary electric machine 10, however, is not limited to the above and may serve as a 1/c series rotary electric machine which is explained as below.

According to the 1/c series rotary electric machine 10, the stator 20 is formed in the fractional slot configuration where the number of slots per pole per phase is a non-integer. The stator winding 22 is wound by the fractional slot winding. The stator core 21 or the rotor core 31 (for example, the rotor core 31) includes the base portion 41 and the single or plural position portion(s) 42. The position portion 42 is connected to the base portion 41 in the third direction (arrow Z direction) and is displaced in the first direction (arrow X direction) relative to the base portion 41. At this time, the moving (i.e., rotating) direction of the rotor 30 relative to the stator 20 is specified in the first direction (arrow X direction), the facing direction between the stator 20 and the rotor 30 is specified in the second direction (arrow Y direction), and the direction orthogonal to both the first direction and the second direction is specified to be the third direction (arrow Z direction).

The 1/c series rotary electric machine 10 where the stator 20 includes the fractional slot configuration and the stator winding 22 is wound by the fractional slot winding includes the skew configuration. Thus, the magnetic attraction distribution of the rotor poles adjacent to one another in the third direction (arrow Z direction) may be mixed and averaged. Thus, in the rotary electric machine 10, a high order substantially the same level as a case where a stator is formed in the integral slot configuration is obtained in the distribution of the attraction force. The number of rotations that matches the natural frequency of vibration of the stator core 21 increases so as to fall out of the range of drive rotation numbers of the rotary electric machine 10. That is, the opportunity of resonance of the stator 20 is avoidable to decrease at least one of the noise and vibration that is generated upon driving of the rotary electric machine 10. In addition, according to the rotary electric machine 10, portions of the torque ripple including different phases from each other overlap to be cancelled out to thereby decrease the torque ripple.

At this time, an integer part of the number of slots per pole per phase when the number of slots per pole per phase is represented in a mixed fraction is an integer part a, a numerator part is a numerator part b, and a denominator part is a denominator part c when a proper fraction part of the mixed fraction is represented by an irreducible fraction. In addition, the integer part a, the numerator part b and the denominator part c are all positive integers. The denominator part c is an integer equal to or greater than two and is not the integer multiples of three. This is because, in a case where the denominator part c is multiples of three, the stator winding 22 cannot be wound in the fractional slot winding.

Figure 21:
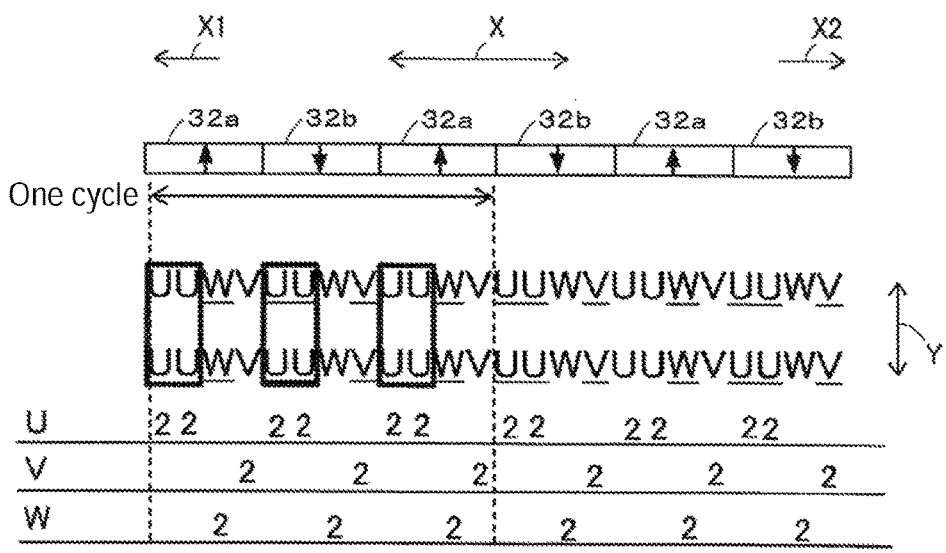
FIG. 21 is a schematic view illustrating an example of the number of windings per phase of the rotary electric machine serving as a 4/3 series rotary electric machine.

For example, in the 4/3 series rotary electric machine 10 as illustrated in FIG. 21, the number of windings is uneven between the phases. FIG. 21 illustrates an example of winding number distribution for each phase of the rotary electric machine 10 serving as a 6-pole 24-slot rotary electric machine. For example, the number of windings of the U-phase is greater than the number of windings of the V-phase and the W-phase, which leads to uneven windings between the phases.

Figure 22:
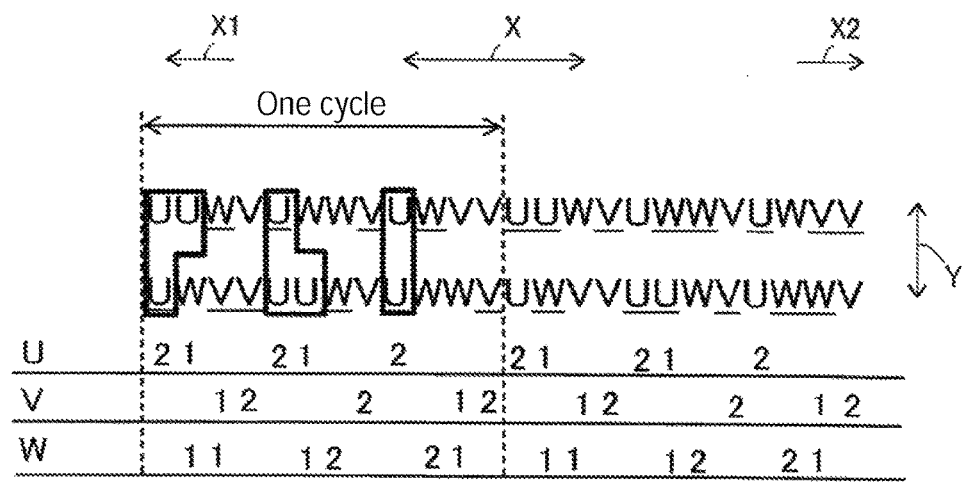
FIG. 22 is a schematic view illustrating another example of the number of windings per phase of the 4/3 series rotary electric machine.

In addition, as illustrated in FIG. 22, even in a case where the number of windings is the same between the phases, the winding number distribution is uneven between the phases. FIG. 22 illustrates another example of winding number distribution for each phase of the 6-pole 24-slot rotary electric machine 10. For example, the number of windings of the U-phase is 2, 1, 0, 0, 2, 1, 0, 0, 2, 0, 0 and 0 in order in one cycle. The number of windings of the V-phase is 0, 0, 1, 2, 0, 0, 0, 2, 0, 0, 1 and 2 in order in one cycle. The number of windings of the W-phase is 0, 1, 1, 0, 0, 1, 2, 0, 0, 2, 1 and 0 in order in one cycle. Accordingly, when the denominator part c is multiples of three, the winding number distribution is uneven between the phases and thus the stator winding 22 is inhibited from being wound in the fractional slot winding.

(Reduction of Noise and Vibration)

The average skew amount of the single or plural position portion(s) 42 relative to the base portion 41 for reducing at least one of the noise and vibration that occurs at the driving of the rotary electric machine 10 is the first average skew amount Sav1. The first average skew amount Sav1 in a case where the lamination thickness t10 of the base portion 41 in the third direction (arrow Z direction) and the lamination thickness t11 of the single or plural position portion(s) 42 in the third direction are the same as each other may be favorably expressed by a formula 1 below using a skew amount specifying portion d.

$$Sav1 = (c-1)/(2 \times d) \quad \text{(Formula 1)}$$

At this time, the skew amount specifying portion d is an integer number equal to or greater than the denominator part c and a reciprocal of the skew amount specifying portion d indicates the skew amount in the stator pole pitch. In addition, the first average skew amount Sav1 serves as the average skew amount in the stator pole pitch calculated under conditions where the skew amount of the base portion 41 is zero and the skew amount zero of the base portion 41 is included for the calculation.

The reciprocal 1/d of the skew amount specifying portion d indicates the skew amount of the position portion 42 relative to the base portion 41 in the stator pole pitch. In the 1/c series rotary electric machine 10, the number of types (kinds) equal to the number c of the pole facing states between the stator poles and the rotor poles 32a, 32b are obtained. The pole facing state is equivalent with respect to the number c of poles (rotor poles). Thus, in order to decrease at least one of the noise and vibration that occurs at the driving of the rotary electric machine 10, the number of types (kinds) equal to the number c of skew amounts including the skew amount zero of the base portion 41 is necessary.

For example, as mentioned in the first embodiment, in a case where the denominator part c is two (i.e., ½ series rotary electric machine 10), the skew amount of the base portion 41 is specified to be zero and the skew amount of the position portion 42 relative to the base portion 41 is specified to be ½ pitch. As a result, the first average skew amount Sav1 is ¼ pitch (=(2−1)/(2×2)). In addition, as mentioned in the fifth embodiment, in a case where the denominator part c is four (i.e., ¼ series rotary electric machine 10), the skew amount of the position portion 42 relative to the base portion 41 is specified to be ¼, ½, ¾ in the stator pole pitch with the skew amount of the base portion 41 serving as zero. As a result, the first average skew amount Sav1 is ⅜ pitch (=(4−1)/(2×4)). The first average skew amount Sav1 may be specified in the same way in a case where the denominator part c is equal to or greater than 5 and may be expressed by the aforementioned formula 1.

According to the rotary electric machine 10 of the disclosure, the first average skew amount Sav1 is favorably expressed by the aforementioned formula 1. The magnetic attraction distributions of the rotor poles 32a adjacent to one another in the third direction (arrow Z direction) are mixed and averaged in the second direction (arrow Y direction). Such condition is also applied to the rotor poles 32b adjacent to one another in the third direction (arrow Z direction). As a result, the attraction distribution of the rotor pole 32a (specifically, the rotor poles 32a adjacent to one another in the third direction) and the attraction distribution of the rotor pole 32b (specifically, the rotor poles 32b adjacent to one another in the third direction) become closer to a substantially equivalent state. Thus, in the rotary electric machine 10 of the disclosure, the component of the vibratory force of a smaller order (i.e., order obtained by dividing the number of magnetic poles of the rotor 30 corresponding to the number of the rotor poles 32a, 32b adjacent to one another in the circumferential direction (arrow X direction) by the denominator part c) than the component of the vibratory force of the order which relies on the number of poles of the rotor 30 is reduced to thereby increase the component of the vibratory force of the order which relies on the number of poles of the rotor 30. Consequently, in the rotary electric machine 10 of the disclosure, a high order substantially the same level as a case where a stator is formed in the integral slot configuration is obtained in the distribution of the attraction force. The number of rotations that matches the natural frequency of vibration of the stator core 21 increases so as to be specified out of the range of the drive rotation numbers. That is, in the rotary electric machine 10 of the disclosure, the opportunity of resonance of the stator 20 is avoidable to reduce at least one of the noise and vibration that occurs upon the driving of the rotary electric machine 10.

The skew amount specifying portion d may be specified to any integer number equal to or greater than the denominator part c. That is, the skew amount specifying portion d is not necessarily specified to be equal to the denominator part c as in the aforementioned embodiments. The skew amounts of the plural position portions 42 relative to the base portion 41 may be different from one another. Nevertheless, the first average skew amount Sav1 needs to be expressed by the aforementioned formula 1. For example, in the ¼ series rotary electric machine 10 where the denominator portion c is 4, the skew amount of the first position portion 42a relative to the base portion 41 may be ⅕ pitch, the skew amount of the second position portion 42b relative to the base portion 41 may be ⅖ pitch, and the skew amount of the third position portion 42c relative to the base portion 41 may be ⅗ pitch.

At this time, the first average skew amount Sav1 is ³⁄₁₀ pitch (=(0+⅕+⅖+⅗)/4) which is smaller than ⅜ pitch obtained in the fifth embodiment in a case where the skew amount specifying portion is specified to be the same value as the denominator part c (d=c=4). Thus, the aforementioned effects (i.e., reduction of at least one of the noise and vibration that occurs at the driving of the rotary electric machine 10 and reduction of the torque ripple) in a case where the first average skew amount Sav1 is ³⁄₁₀ pitch decreases as compared to a case where the skew amount specifying portion d is specified to be the same value as the denominator part c (d=c=4), however, the decrease of the output torque by including the skew configuration may be restrained.

In a case where the plural position portions 42 are provided, it is favorable for the rotary electric machine 10 that the sum of skew amounts between the adjacent portions including the base portion 41 is minimal with the same conditions of the number of the position portions 42. As a result, the decrease of the output torque by including the skew configuration may be restrained.

In addition, the skew amounts of the base portion 41 and the single or plural position portion(s) 42 in a state where the skew amount of the base portion 41 is specified to be zero may be favorably expressed in the arithmetic progression by 0, 1/d, . . . (c−1)/d when being indicated in order from one of the portions at the end in the axial direction (arrow Z direction), i.e., in this case, from the base portion 41. Accordingly, the skew amounts between the adjacent portions, i.e., the base portion 41 and the single or plural position portion(s) 42, may be constant. It may be easy to reduce the number of variations of jigs for obtaining the base portion 41 and the position portion(s) 42, which leads to simplification of a manufacturing process.

Further, the skew amount specifying portion d may be favorably specified to be the same value as the denominator part c. As a result, as compared to a case where the skew amount specifying portion d is not the same value as the denominator portion c (i.e., the skew amount specifying portion d is an integer number greater than the denominator part c), symmetric property of attraction distributions of the rotor poles 32a and 32b is enhanced. That is, the attraction distribution of the rotor pole(s) 32a and the attraction distribution of the rotor pole(s) 32b become closer to the equivalent state. In a case where the skew amount specifying portion d is specified to be the same value as the denominator part c, the first average skew amount Sav1 increases as compared to a case where the skew amount specifying portion d is not the same value as the denominator portion c. Thus, the effect for reducing at least one of the noise and vibration that occurs at the driving of the rotary electric machine 10 may improve.

(Reduction of Torque Ripple)

The average skew amount of the single or plural position portion(s) 42 relative to the base portion 41 for reducing the torque ripple of the rotary electric machine 10 is the second average skew amount Sav2. The second average skew amount Sav2 in a case where the lamination thickness t10 of the base portion 41 in the third direction (arrow Z direction) and the lamination thickness t11 of the single or plural position portion(s) 42 in the third direction are the same as each other may be favorably expressed by a formula 2 below using the skew amount specifying portion d.

$$Sav2=1/(2\times d) \qquad \text{(Formula 2)}$$

At this time, the second average skew amount Sav2 serves as the average skew amount in the stator pole pitch calculated under conditions where the skew amount of the base portion 41 is zero and the skew amount zero of the base portion 41 is included for the calculation. The skew amount specifying portion d in the formula 2 is the same as that in the aforementioned formula 1. In order to decrease the torque ripple (cogging torque), portions of the torque ripple (cogging torque) having different phases from each other need to overlap and to be cancelled out.

For example, as explained in the aforementioned second embodiment, in a case where the denominator part c is 2 (i.e., ½ series rotary electric machine 10), the skew amount of the position portion 42 relative to the base portion 41 of which the skew amount is zero is specified to be ¼ pitch. As a result, the second average skew amount Sav2 is ⅛ pitch (=1/(2×4)). In addition, as explained in the aforementioned fifth embodiment, in a case where the denominator part c is 4 (i.e., ¼ series rotary electric machine 10), the skew amount of the position portion 42 relative to the base portion 41 of which the skew amount is zero is specified to be ⅛ pitch. As a result, the second average skew amount Sav2 is 1/16 pitch (=1/(2×8)). The second average skew amount Sav2 may be specified in the same way in a case where the denominator part c is equal to or greater than 5 and may be expressed by the aforementioned formula 2.

In the rotary electric machine 10, the second average skew amount Sav2 may be favorably expressed by the formula 2. As a result, portions of the torque ripple (cogging torque) generated between the rotor poles 32a, 32b provided at the base portion 41 and the stator poles and generated between the rotor poles 32a, 32b provided at the position portion 42 and the stator poles overlap to be cancelled out each other, thereby decreasing the total torque ripple (cogging torque).

The skew amount specifying portion d is not necessary specified to two times of the denominator part c. In addition, three or more kinds of skew amounts (the skew amounts of the plural position portions 42 are specified to include predetermined phase differences from one another with the skew amount of the base portion 41 serving as zero) may be employed. At this time, however, the second average skew amount Sav2 needs to be expressed by the formula 2. For example, in the 8-pole 60-slot rotary electric machine 10 serving as the ½ series rotary electric machine, 3 mechanical degrees as one cycle of the cogging torque corresponds to ½ pitch. Thus, the skew amount of the first position portion 42a relative to the base portion 41 of which the skew amount is zero may be ⅙ pitch, and the skew amount of the second position portion 42b relative to the base portion 41 may be ⅓ pitch. At this time, the second average skew amount Sav2 is ⅙ pitch (=1/(2×3)). Accordingly, the cogging torque including phase differences of 120° is generated so that portions of the cogging torque including the different phases overlap to be cancelled out one another, thereby decreasing the cogging torque.

The skew amounts of the base portion 41 and the single position portion 42 in a state where the skew amount of the base portion 41 is specified to be zero may be favorably expressed by 0, 1/d. As a result, the rotary electric machine 10 of the disclosure may decrease the torque ripple (cogging torque) with the minimum skew amount and minimum kinds of terms (i.e., two kinds of terms corresponding to 0 and 1/d). Consequently, the rotary electric machine 10 may minimize and restrain the decrease of the output torque which occurs by including the skew configuration.

The skew amount specifying portion d may be favorably specified to two times of the denominator part c. As a result, in the rotary electric machine 10 of the disclosure, the skew amount of the position portion 42 relative to the base portion 41 may be specified to be a half cycle of the cogging torque. As compared to a case where the skew amount specifying portion d is not specified to two times of the denominator part c, the reduction effect of the cogging torque is enhanced, which leads to improvement of the reduction effect of the torque ripple.

(Reduction of Noise and Vibration and Reduction or Torque Ripple)

The average skew amount of the plural position portions 42 relative to the base portion 41 for decreasing at least one of the noise and vibration that occurs at the driving of the rotary electric machine 10 and the torque ripple of the rotary electric machine 10 is the third average skew amount Sav3. The third average skew amount Sav3 in a case where the lamination thickness t10 of the base portion 41 in the third direction (arrow Z direction) and the lamination thickness t11 of the single or plural position portion(s) 42 in the third direction are the same as each other may be favorably expressed by a formula 3 below using the skew amount specifying portion d. At this time, the third average skew amount Sav3 is the average skew amount in the stator pole pitch calculated under conditions where the skew amount of the base portion 41 is zero and the skew amount zero of the base portion 41 is included for the calculation.

$$Sav3=(c-1)/(2\times c)+1/(4\times c) \qquad \text{(Formula 3)}$$

For example, as mentioned in the aforementioned third embodiment, in a case where the denominator part c is 2 (i.e., ½ series rotary electric machine 10), the skew amounts of the plural (three) position portions 42 relative to the base portion 41 of which the skew amount is zero are represented as ¼, ½, ¾ in the stator pole pitch. Thus, the third average skew amount Sav3 is ⅜ pitch (=(2−1)/(2×2)+1/(4×2)). In addition, as mentioned in the fifth embodiment, in a case where the denominator part c is 4 (i.e., ¼ series rotary electric machine 10), the skew amounts of the plural (seven) position portions 42 relative to the base portion 41 of which the skew amount is zero are represented as ⅛, ¼, ⅜, ½, ⅝, ¾, and ⅞ in the stator pole pitch. Thus, the third average skew amount Sav3 is 7/16 pitch (=(4−1)/(2×4)+1/(4×4)). The third average skew amount Sav3 may be specified in the same way in a case where the denominator part c is equal to or greater than 5 and may be expressed by the formula 3.

In the rotary electric machine 10 of the disclosure, the third average skew amount Sav3 may be favorably expressed by the formula 3. As a result, the rotary electric machine 10 may decrease at least one of the noise and vibration that occurs at the driving of the rotary electric machine 10 and the torque ripple (cogging torque) of the rotary electric machine 10. The skew amount of the position portion 42 relative to the base portion 41 is not limited to the aforementioned skew amount. At this time, however, the third average skew amount Sav3 needs to be expressed by the formula 3.

The skew amounts of the base portion 41 and the plural position portions 42 in a case where the skew amount of the base portion 41 is specified to be zero may be favorably represented as the skew amounts where the first group of skew amounts and the second group of skew amounts are combined. The first group of skew amounts is expressed in the arithmetic progression by 0, 1/c . . . and (c−1)/c when being indicated in the ascending order. The second group of skew amounts is obtained by adding $1/(2 \times c)$ to each of the skew amounts in the first group and are expressed in the arithmetic progression by $1/(2 \times c)$, $3/(2 \times c)$, . . . and $(2 \times c - 1)/(2 \times c)$.

The first group of skew amounts and the second group of skew amounts are combined so that the skew amounts are indicated in the ascending order in the arithmetic progression. The arithmetic progression includes the number ($2 \times c$) of skew amounts. Specifically, the arithmetic progression is expressed by 0, $1/(2 \times c)$, $2/(2 \times c)$, $3/(2 \times c)$, $(2 \times c - 2)/(2 \times c)$, and $(2 \times c - 1)/(2 \times c)$. The sum of the sequence of numbers (terms) of the aforementioned arithmetic progression is $(2 \times c - 1)/2$. The aforementioned sum is divided by the number of terms, i.e., divided by ($2 \times c$) to calculate the average, which results in $(2 \times c - 1)/(4 \times c)$. The average of the sum of the sequence of numbers (terms) of the arithmetic progression may be expressed by $(c-1)/(2 \times c) + 1/(4 \times c)$ which matches the formula 3. The first group of skew amounts serves as the skew amount with which at least one of the noise and vibration that occurs at the driving of the rotary electric machine 10 may be reduced. The term $1/(2 \times c)$ which is added to each of the skew amounts in the first group serves as the skew amount with which the torque ripple (cogging torque) may be reduced.

The skew amounts of the base portion 41 and the plural position portions 42 in a state where the skew amount of the base portion 41 is specified to be zero may be favorably represented as the skew amounts where the first group of skew amounts and the second group of skew amounts are combined. As a result, the rotary electric machine 10 may easily achieve the reduction of at least one of the noise and vibration that occurs at the driving of the rotary electric machine 10 and the reduction of the torque ripple (cogging torque) of the rotary electric machine 10. That is, according to the rotary electric machine 10 of the disclosure, the second group of skew amounts may be easily obtained by adding the skew amount ($1/(2 \times c)$) with which the torque ripple (cogging torque) of the rotary electric machine 10 may be reduced to each of the skew amounts in the first group with which at least one of the noise and vibration that occurs at the driving of the rotary electric machine 10 may be reduced.

In addition, in the rotary electric machine 10 of the disclosure, the sum of skew amounts between the adjacent portions including the base portion 41 under the conditions with the same number of the position portions 42 is minimal. Consequently, the rotary electric machine 10 of the disclosure may minimize and restrain the decrease of the output torque caused by the skew configuration.

Further, in the rotary electric machine 10 of the disclosure, the number of terms represented as 1/c pitch suitable for reducing at least one of the noise and vibration that occurs at the driving of the rotary electric machine 10 in the sequence of numbers of the skew amounts between the adjacent portions (portions 41 and 42) may be favorably maximum under the conditions of the same numbers of the position portions 42. Consequently, the rotary electric machine 10 may maximize the reduction effect of at least one of the noise and vibration that occurs at the driving of the rotary electric machine 10.

The embodiments are not limited to include the aforementioned configurations and are appropriately changed or modified. For example, in the disclosure, the position portion 42 is displaced in the first direction (arrow X direction) relative to the base portion 41 in a stepped manner, i.e., a so-called stepped skew is employed for the position portion 42. Alternatively, the position portion 42 may be continuously displaced relative to the base portion 41 in the first direction, i.e., a so-called continuous skew may be employed for the position portion 42. According to the continuous skew, a flux leakage may be reduced as compared to the stepped skew. At this time, however, the skew amount of the position portion 42 relative to the base portion 41 according to the continuous skew is specified to two times of the skew amount according to the stepped skew.

In addition, in the disclosure, the base portion 41 and the single or plural position portions 42 are provided at the rotor core 31. Alternatively, the base portion 41 and the single or plural position portions 42 may be provided at the stator core 21. In this case, the first average skew amount Sav1 in the stator pole pitch is also calculated in a state where the skew amount of the base portion 41 is specified to be zero and the skew amount zero of the base portion 41 is included for the calculation. This condition is also applied to the second average skew amount Sav2 and the third average skew amount Sav3.

Further, in the disclosure, the rotor 30 is disposed at a radially inner side of the stator 20. Alternatively, the rotor 30 may be disposed at a radially outer side of the stator 20. The rotary electric machine 10 is not limited to the cylindrical rotary electric machine including a radial gap type where the stator 20 and the rotor 30 are arranged coaxially with each other. The rotary electric machine 10 may be applied to a linear-type rotary electric machine where the rotor 30 moves linearly relative to the stator 20. Further, the rotary electric machine 10 may be applied to various types of rotary electric machines where the stator 20 includes the fractional slot configuration. For example, the rotary electric machine 10 may be applied to a driving motor or a generator for a vehicle, an industrial driving motor or generator, and a household driving motor or generator, for example.

The stator 20 of the rotary electric machine 10 of the embodiments is formed in the fractional slot configuration. The stator winding 22 is wound by the fractional slot winding. In addition, one of the stator core 21 and the rotor core 31 includes the base portion 41 and the single or plural position portion(s) 42. That is, the rotary electric machine 10 of the embodiments where the stator 20 is formed in the fractional slot configuration and the stator winding 22 is wound by the fractional slot winding includes a so-called skew configuration. Therefore, in the rotary electric machine 10 of the embodiments, the magnetic attraction distributions of the rotor poles 32a and 32b adjacent to one another in the third direction may be mixed and averaged. A high order substantially the same level as a case where a stator is formed in the integral slot configuration is obtained in the attraction distributions. The number of rotations that matches the natural frequency of vibration of the stator core 21 increases so as to fall out of the range of drive rotation numbers of the rotary electric machine 10. That is, according to the rotary electric machine 10 of the embodiments, the opportunity of resonance of the stator 20 is avoidable to thereby decrease at least one of the noise and vibration that is generated upon driving of the rotary electric machine 10. In addition, according to the rotary electric machine 10 of the embodiments, the torque ripple may be reduced by overlapping and cancelling out of portions of the torque ripple including different phase from each other.

In the disclosure, either the single position portion 42 or the plural position portions 42 obtains the first average skew amount Sav1 serving as the average skew amount relative to the base portion 41 for reducing at least one of the noise and vibration that occurs at the driving of the rotary electric machine 10. The first average skew amount Sav1 in a case where the lamination thickness t10 of the base portion 41 in the third direction and the lamination thickness t11 of either the single position portion 42 or the plural position portions 42 in the third direction are the same as one another is expressed by the formula 1:

$$Sav1=(c-1)/(2\times d) \qquad \text{(Formula 1)}$$

where c is the denominator part of the irreducible fraction representing the proper fraction part of the mixed fraction by which the number of slots per pole per phase is expressed, the mixed fraction including the integer part a and the irreducible fraction including the numerator part b, where d is the skew amount specifying portion serving as an integer equal to or greater than the denominator part c, the reciprocal of the skew amount specifying portion d indicating the skew amount in the stator pole pitch. The first average skew amount Sav1 is calculated in a state where the skew amount of the base portion 41 is specified to be zero and the value zero of the skew amount of the base portion 41 is included for the calculation, the first average skew amount Sav1 serving as the average skew amount in the stator pole pitch. The integer part a, the numerator part b and the denominator part c are positive integers, the denominator part c being equal to or greater than two and inhibited from being a multiple of three.

In addition, the sum of skew amounts between adjacent portions including the base portion 41 and the plural position portions 42 is minimum under the condition where the number of the position portions 42 is the same.

Further, the skew amounts of the base portion 41 and either the single position portion 42 or the plural position portions 42 in a case where the skew amount of the base portion 41 is specified to be zero is represented by the arithmetic progression as 0, 1/d, ... and (c−1)/d in order from one of the base portion 41 and either the single position portion 42 or the plural position portions 42 disposed at the end side in the third direction.

Furthermore, the skew amount specifying portion d is specified to be the same value as the denominator c.

Furthermore, either the single position portion 42 or the plural position portions 42 obtains the second average skew amount Sav2 serving as the average skew amount relative to the base portion 41 for reducing the torque ripple of the rotary electric machine 10. The second average skew amount Sav2 in a case where the lamination thickness t10 of the base portion 41 in the third direction and the lamination thickness t11 of either the single position portion 42 or the plural position portions 42 in the third direction are the same as one another is expressed by the formula 2:

$$Sav2=1/(2\times d) \qquad \text{(Formula 2)}$$

where c is the denominator part of the irreducible fraction representing the proper fraction part of the mixed fraction by which the number of slots per pole per phase is expressed, the mixed fraction including the integer part a and the irreducible fraction including the numerator part b, where d is the skew amount specifying portion serving as an integer equal to or greater than the denominator part c, the reciprocal of the skew amount specifying portion d indicating the skew amount in the stator pole pitch. The second average skew amount Sav2 is calculated in a state where the skew amount of the base portion 41 is specified to be zero and the value zero of the skew amount of the base portion 41 is included for the calculation, the second average skew amount Sav2 serving as the average skew amount in the stator pole pitch. The integer part a, the numerator part b and the denominator part c are positive integers, the denominator part c being equal to or greater than two and inhibited from being a multiple of three.

Furthermore, the skew amounts of the base portion 41 and the single position portion 42 in a case where the skew amount of the base portion 41 is specified to be zero is represented as 0 and 1/d.

Furthermore, the skew amount specifying portion d is specified to be two times of the denominator part c.

Furthermore, the plural position portions 42 obtains the third average skew amount Sav3 serving as the average skew amount relative to the base portion 41 for reducing at least one of the noise and vibration that occurs at the driving of the rotary electric machine 10 and for reducing the torque ripple of the rotary electric machine 10. The third average skew amount Sav3 in a case where the lamination thickness t10 of the base portion 41 in the third direction and the lamination thickness t11 of the plural position portions 42 in the third direction are the same as one another is expressed by the formula 3:

$$Sav3=(c-1)/(2\times c)+1/(4\times c) \qquad \text{(Formula 3)}$$

where c is the denominator part of the irreducible fraction representing the proper fraction part of the mixed fraction by which the number of slots per pole per phase is expressed, the mixed fraction including the integer part a and the irreducible fraction including the numerator part b, where d is the skew amount specifying portion serving as an integer equal to or greater than the denominator part c, the reciprocal of the skew amount specifying portion d indicating the skew amount in the stator pole pitch. The third average skew amount Sav3 is calculated in a state where the skew amount of the base portion 41 is specified to be zero and the value zero of the skew amount of the base portion 41 is included for the calculation, the third average skew amount Sav3 serving as the average skew amount in the stator pole pitch. The integer part a, the numerator part b and the denominator part c are positive integers, the denominator part c being equal to or greater than two and inhibited from being a multiple of three.

Furthermore, the skew amounts of the base portion 41 and the plural position portions 42 in a case where the skew amount of the base portion 41 is specified to be zero is represented by a combination of the first group of skew amounts and the second group of skew amounts, the first group of skew amounts being represented by the arithmetic progression as 0, 1/c, ... and (c−1)/c in the ascending order, the second group of skew amounts being represented by the arithmetic progression as 1/(2×c), 3/(2×c), ... and (2×c−1)/(2×c) in the ascending order.

Furthermore, the sum of skew amounts between adjacent portions including the base portion 41 and the plural position portions 42 is minimum under the condition where the number of the position portions 42 is the same.

Furthermore, the number of terms represented by 1/c in the stator pole pitch for reducing at least one of the noise and the vibration that occurs at the driving of the rotary electric machine 10 included in the skew amounts between adjacent portions including the base portion 41 and the plural position portions 42 is maximum under the condition where the number of the plural position portions 42 is the same.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotary electric machine comprising:
a stator including a stator winding which is inserted to be positioned within a plurality of slots formed at a stator core; and
a rotor supported at the stator to be movable relative to the stator in a first direction and arranged to face the stator in a second direction, the rotor including a plurality of pairs of rotor poles at a rotor core, each pair of the plurality of pairs of rotor poles including different polarities from each other, wherein
the stator includes a fractional slot configuration where the number of slots per pole per phase is a non-integer,
the stator winding is wound by a fractional slot winding,
one of the stator core and the rotor core includes a base portion and either a single position portion or a plurality of position portions which is connected to the base portion in a third direction and which is displaced relative to the base portion in the first direction, the third direction being orthogonal to the first direction and the second direction,
either the single position portion or the plurality of position portions obtains a first average skew amount $Sav1$ serving as an average skew amount relative to the base portion for reducing at least one of a noise and a vibration that occurs at a driving of the rotary electric machine,
the first average skew amount $Sav1$ in a case where a lamination thickness of the base portion in the third direction and a lamination thickness of either the single position portion or the plurality of position portions in the third direction are the same as one another is expressed by a formula 1:

$$Sav1=(c-1)/(2\times d) \quad \text{(Formula 1)}$$

where c is a denominator part of an irreducible fraction representing a proper fraction part of a mixed fraction by which the number of slots per pole per phase is expressed, the mixed fraction including an integer part a and the irreducible fraction including a numerator part b,
where d is a skew amount specifying portion serving as an integer equal to or greater than the denominator part c, a reciprocal of the skew amount specifying portion d indicating a skew amount in a stator pole pitch,
the first average skew amount $Sav1$ is calculated in a state where a skew amount of the base portion is specified to be zero and the value zero of the skew amount of the base portion is included for the calculation, the first average skew amount $Sav1$ serving as an average skew amount in the stator pole pitch, and
the integer part a, the numerator part b and the denominator part c are positive integers, the denominator part c being equal to or greater than two and inhibited from being a multiple of three.

2. The rotary electric machine according to claim 1, wherein a sum of skew amounts between adjacent portions including the base portion and the plurality of position portions is minimum under a condition where a skew amount of each of the position portions is the same.

3. The rotary electric machine according to claim 1, wherein skew amounts of the base portion and either the single position portion or the plurality of position portions in a case where the skew amount of the base portion is specified to be zero is represented by an arithmetic progression as 0, 1/d, ... and (c−1)/d in order from one of the base portion and either the single position portion or the plurality of position portions disposed at an end side in the third direction.

4. The rotary electric machine according to claim 1, wherein the skew amount specifying portion d is specified to be the same value as the denominator c.

5. The rotary electric machine according to claim 1, wherein
either the single position portion or the plurality of position portions obtains a second average skew amount $Sav2$ serving as an average skew amount relative to the base portion for reducing a torque ripple of the rotary electric machine,
the second average skew amount $Sav2$ in a case where a lamination thickness of the base portion in the third direction and a lamination thickness of either the single position portion or the plurality of position portions in the third direction are the same as one another is expressed by a formula 2:

$$Sav2=1/(2\times d) \quad \text{(Formula 2)}$$

the second average skew amount $Sav2$ is calculated in a state where a skew amount of the base portion is specified to be zero and the value zero of the skew amount of the base portion is included for the calculation, the second average skew amount $Sav2$ serving as the average skew amount in the stator pole pitch, and
the integer part a, the numerator part b and the denominator part c are positive integers, the denominator part c being equal to or greater than two and inhibited from being a multiple of three.

6. The rotary electric machine according to claim 5, wherein skew amounts of the base portion and the single position portion in a case where the skew amount of the base portion is specified to be zero is represented as 0 and 1/d.

7. The rotary electric machine according to claim 6, wherein the skew amount specifying portion d is specified to be two times of the denominator part c.

8. The rotary electric machine according to claim 1, wherein
the plurality of position portions obtains a third average skew amount $Sav3$ serving as an average skew amount relative to the base portion for reducing at least one of a noise and a vibration that occurs at the driving of the rotary electric machine and for reducing a torque ripple of the rotary electric machine,
the third average skew amount $Sav3$ in a case where the lamination thickness of the base portion in the third direction and a lamination thickness of the plurality of position portions in the third direction are the same as one another is expressed by a formula 3:

$$Sav3=(c-1)/(2\times c)=1/(4\times c) \quad \text{(Formula 3)}$$

the third average skew amount Sav3 is calculated in a state where a skew amount of the base portion is specified to be zero and the value zero of the skew amount of the base portion is included for the calculation, the third average skew amount Sav3 serving as the average skew amount in the stator pole pitch, and the integer part a, the numerator part b and the denominator part c are positive integers, the denominator part c being equal to or greater than two and inhibited from being a multiple of three.

9. The rotary electric machine according to claim 8, wherein skew amounts of the base portion and the plurality of position portions in a case where the skew amount of the base portion is specified to be zero is represented by a combination of a first group of skew amounts and a second group of skew amounts, the first group of skew amounts being represented by an arithmetic progression as 0, 1/c, . . . and (c−1)/c in an ascending order, the second group of skew amounts being represented by the arithmetic progression as 1/(2×c), 3/(2×c), . . . and (2×c−1)/(2×c) in the ascending order.

10. The rotary electric machine according to claim 8, wherein a sum of skew amounts between adjacent portions including the base portion and the plurality of position portions is minimum under a condition where the number of the position portions is the same.

11. The rotary electric machine according to claim 8, wherein the number of terms represented by 1/c in the stator pole pitch for reducing at least one of the noise and the vibration that occurs at the driving of the rotary electric machine included in the skew amounts between adjacent portions including the base portion and the plurality of position portions is maximum under a condition where the number of the plurality of position portions is the same.

* * * * *